US012056956B2

(12) United States Patent
Casado et al.

(10) Patent No.: US 12,056,956 B2
(45) Date of Patent: Aug. 6, 2024

(54) ENROLLMENT WITH AN AUTOMATED ASSISTANT

(71) Applicant: GOOGLE LLC, Mountain View, CA (US)

(72) Inventors: Diego Melendo Casado, Mountain View, CA (US); Tuan Nguyen, San Jose, CA (US); Jaclyn Konzelmann, Mountain View, CA (US); Gustavo Moura, Boulder, CO (US); Tanya Kraljic, Ridgewood, NJ (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/204,785

(22) Filed: Jun. 1, 2023

(65) Prior Publication Data
US 2023/0316814 A1    Oct. 5, 2023

Related U.S. Application Data

(63) Continuation of application No. 17/580,334, filed on Jan. 20, 2022, now Pat. No. 11,704,940, which is a
(Continued)

(51) Int. Cl.
*G06V 40/50* (2022.01)
*G06V 40/16* (2022.01)
(Continued)

(52) U.S. Cl.
CPC ............ *G06V 40/50* (2022.01); *G06V 40/161* (2022.01); *G06V 40/70* (2022.01); *G10L 17/00* (2013.01); *G10L 17/04* (2013.01)

(58) Field of Classification Search
CPC ...... G06V 40/50; G06V 40/161; G06V 40/70; G10L 17/04
See application file for complete search history.

(56) References Cited

U.S. PATENT DOCUMENTS

| 4,449,189 A | 5/1984 | Feix et al. |
| 6,111,517 A | 8/2000 | Atick et al. |

(Continued)

FOREIGN PATENT DOCUMENTS

| EP | 3570239 | 11/2019 | |
| EP | 3570239 A1 * | 11/2019 | ............. G06F 21/32 |

(Continued)

OTHER PUBLICATIONS

Akrouf, Samir et al.; A Multi-Modal Recognition System Using Face and Speech; IJCSI; vol. 8, Issue 3, No. 1; pp. 230-236; dated May 2011.

(Continued)

*Primary Examiner* — Darshan I Dhruv
(74) *Attorney, Agent, or Firm* — Gray Ice Higdon

(57) ABSTRACT

Techniques are described herein for dialog-based enrollment of individual users for single- and/or multi-modal recognition by an automated assistant, as well as determining how to respond to a particular user's request based on the particular user being enrolled and/or recognized. Rather than requiring operation of a graphical user interface for individual enrollment, dialog-based enrollment enables users to enroll themselves (or others) by way of a human-to-computer dialog with the automated assistant.

15 Claims, 14 Drawing Sheets

Related U.S. Application Data continuation of application No. 16/787,581, filed on Feb. 11, 2020, now Pat. No. 11,238,294, which is a continuation-in-part of application No. 16/403,532, filed on May 4, 2019, now Pat. No. 11,238,142, which is a continuation-in-part of application No. PCT/US2018/056225, filed on Oct. 17, 2018.

(60) Provisional application No. 62/742,687, filed on Oct. 8, 2018.

(51) Int. Cl.
*G06V 40/70* (2022.01)
*G10L 17/00* (2013.01)
*G10L 17/04* (2013.01)

(56) References Cited

U.S. PATENT DOCUMENTS

| | | | |
|---|---|---|---|
| 8,897,500 B2* | 11/2014 | Syrdal | G06V 40/171 |
| | | | 382/116 |
| 9,286,899 B1 | 3/2016 | Narayanan | |
| 9,654,469 B1* | 5/2017 | Yang | H04L 67/02 |
| 9,990,926 B1 | 6/2018 | Pearce | |
| 10,490,195 B1* | 11/2019 | Krishnamoorthy | G10L 17/22 |
| 10,553,119 B1* | 2/2020 | Shah | G06Q 50/40 |
| 10,957,329 B1* | 3/2021 | Liu | G06F 16/9532 |
| 2003/0126121 A1* | 7/2003 | Khan | G06F 18/00 |
| | | | 707/E17.02 |
| 2006/0261931 A1 | 11/2006 | Cheng | |
| 2007/0172099 A1 | 7/2007 | Park et al. | |
| 2012/0281885 A1* | 11/2012 | Syrdal | G06V 40/166 |
| | | | 382/116 |
| 2013/0129160 A1 | 5/2013 | Yamada et al. | |
| 2013/0286161 A1 | 10/2013 | Lv et al. | |
| 2014/0016835 A1* | 1/2014 | Song | G10L 17/06 |
| | | | 382/118 |
| 2014/0237587 A1* | 8/2014 | Forbes | G06F 21/32 |
| | | | 726/18 |
| 2014/0328521 A1* | 11/2014 | Colangelo | G06Q 10/10 |
| | | | 382/118 |
| 2014/0366112 A1* | 12/2014 | Hamana | G06F 21/36 |
| | | | 726/7 |
| 2015/0046990 A1* | 2/2015 | Oberheide | G06F 21/45 |
| | | | 726/5 |
| 2015/0081495 A1* | 3/2015 | Randall | G06Q 40/02 |
| | | | 705/35 |
| 2015/0162006 A1 | 6/2015 | Kummer | |
| 2016/0189149 A1* | 6/2016 | MacLaurin | G06Q 20/40145 |
| | | | 705/44 |
| 2016/0217312 A1* | 7/2016 | Gardiner | H04L 63/0861 |
| 2016/0248768 A1 | 8/2016 | McLaren et al. | |
| 2016/0379132 A1* | 12/2016 | Jin | H04L 67/535 |
| | | | 706/12 |
| 2017/0069148 A1 | 3/2017 | Gilbertson | |
| 2017/0110144 A1 | 4/2017 | Sharifi et al. | |
| 2017/0116986 A1* | 4/2017 | Weng | G10L 13/033 |
| 2017/0124385 A1* | 5/2017 | Ganong | G06F 16/50 |
| 2017/0160813 A1* | 6/2017 | Divakaran | G06N 3/006 |
| 2017/0199998 A1* | 7/2017 | Bruno | G06F 21/34 |
| 2017/0243225 A1* | 8/2017 | Kohli | G06Q 20/40145 |
| 2018/0007060 A1* | 1/2018 | Leblang | H04L 63/107 |
| 2018/0165662 A1* | 6/2018 | Nam | G06Q 20/40145 |
| 2018/0218139 A1* | 8/2018 | Tussy | G06V 40/67 |
| 2018/0232201 A1* | 8/2018 | Holtmann | G10L 17/04 |
| 2018/0285628 A1 | 10/2018 | Son et al. | |
| 2019/0027152 A1* | 1/2019 | Huang | G10L 21/0208 |
| 2019/0147152 A1* | 5/2019 | Kurian | G06F 21/32 |
| | | | 382/118 |
| 2019/0246075 A1* | 8/2019 | Khadloya | G06V 40/10 |
| 2019/0278894 A1 | 9/2019 | Andalo et al. | |
| 2019/0332756 A1* | 10/2019 | Khitrov | G06V 40/70 |
| 2019/0342339 A1 | 11/2019 | Nanda et al. | |
| 2019/0355363 A1* | 11/2019 | Nelson | G10L 15/26 |
| 2019/0378519 A1* | 12/2019 | Dunjic | G06F 21/606 |
| 2020/0026830 A1* | 1/2020 | Alameh | H04L 63/105 |
| 2020/0065820 A1* | 2/2020 | Scholl | G06Q 20/3823 |
| 2020/0110864 A1 | 4/2020 | Casado et al. | |
| 2020/0175292 A1 | 6/2020 | Casado et al. | |
| 2020/0342881 A1 | 10/2020 | Casado | |
| 2022/0148339 A1 | 5/2022 | Casado et al. | |

FOREIGN PATENT DOCUMENTS

| | | | |
|---|---|---|---|
| WO | 2016044804 | 3/2016 | |
| WO | WO-2016044804 A1 * | 3/2016 | G06F 21/32 |

OTHER PUBLICATIONS

Albio, Alberto et al.; A Fully Automatic Face Recognition System Using a Combined Audio-Visual Approach; IEE Proceedings; vol. 165, Issue 3; 22 pages; dated Jun. 2005.

Beunder, K.M.; Design of Continuous Authentication Using Face Recognition; Twente Student Conference on IT; 8 pages; dated Jan. 2014.

European Patent Office; International Search Report and Written Opinion of Ser. No. PCT/US2018/056225, 13 pages, dated Jun. 3, 2019.

International Searching Authority; International Search Report and Written Opinion of PCT Ser. No. PCT/US2018/056225; dated Jun. 3, 2019.

United States Patent Office: Office Action issued for U.S. Appl. No. 16/787,581 dated Jul. 8, 2021. 65 pages.

European Patent Office; Communication pursuant to Article 94(3) EPC issued in Application No. 18799630.1; 4 pages; dated Nov. 28, 2023.

European Patent Office; Intention to Grant issued in Application No. 18799630.1; 59 pages; dated Feb. 9, 2024.

China National Intellectual Property Administration; Notification of First Office Action issued for Application No. 201880094608.1, 21 pages, dated Feb. 6, 2024.

* cited by examiner

ENROLLMENT WITH AN AUTOMATED ASSISTANT

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," "virtual assistants," etc.). For example, humans (which when they interact with automated assistants may be referred to as "users") may provide commands, queries, and/or requests (collectively referred to herein as "queries") using free form natural language input which may include vocal utterances converted into text and then processed and/or typed free form natural language input.

Different users may control and/or have permission to access different resources via an automated assistant. For example, a trusted user may have permission to cause the automated assistant to perform various actions that untrusted users may not necessarily be able to perform, such as controlling smart appliances (e.g., lights, thermostats, locks, etc.). As another example, an automated assistant may have the ability to present various content to users. Some of this content, such as personal documents, calendar data, etc., may be protected, and the automated assistant will only present it upon recognition/authentication of the requesting user. The automated assistant may deny unrecognized or unauthorized users access to the same protected content. Other content may not necessarily be protected, but may be inappropriate for some users. For example, children may be prevented from asking an automated assistant to initiate playback of content for which parental discretion is advised.

Configuring existing automated assistants to distinguish between individuals currently requires manual interaction with a graphical user interface, e.g., to turn on a "voice match" feature. Consequently, other individuals who may lack sufficient knowledge or motivation to access such an interface may never enroll with the voice match feature. Further, using voice matching technology (also referred to herein as "speaker recognition processing") by itself to distinguish between different individuals may not be sufficiently reliable, especially in a noisy environment, or in scenarios in which multiple speakers have similar voices/accents.

In many cases, before the automated assistant can interpret and respond to a user's request, it must first be "invoked," e.g., using predefined oral invocation phrases that are often referred to as "hot words" or "wake words." Thus, many automated assistants operate in what will be referred to herein as a "limited hot word listening state" or "default listening state" in which they are always "listening" to audio data sampled by a microphone for a limited (or finite, or "default") set of hot words. Any utterances captured in the audio data other than the default set of hot words are ignored. Once the automated assistant is invoked with one or more of the default set of hot words, it may operate in what will be referred to herein as a "speech recognition state" wherein for at least some time interval after invocation, the automated assistant performs speech-to-text ("STT") processing of audio data sampled by a microphone to generate textual input, which in turn is semantically processed to determine and fulfill a user's intent. Existing automated assistants typically can only be invoked using one or more of the default hot words, which are the same regardless of whether the requesting user is recognized.

SUMMARY

Techniques are described herein to improve security processes in automated assistants by way of enrollment with automated assistants, wherein enrollment with an automated assistant by a user unlocks one or more features of the automated assistant that were unavailable to the user prior to enrollment. In particular techniques are described for dialog-based enrollment of individual users for single- and/or multi-modal recognition by an automated assistant, as well as determining how to respond to a particular user's request based on the particular user being enrolled and/or recognized. Rather than requiring operation of a graphical user interface for individual enrollment, dialog-based enrollment enables users to enroll themselves (or others) by way of a human-to-computer dialog with the automated assistant. Example implementations described herein improve security by placing users in different trust levels, wherein access to functions of the automated assistant that might be considered sensitive, such as controlling appliances and/or accessing protected data, are restricted based on trust level.

Techniques described herein may often (but not exclusively) be employed on what will be referred to herein as "assistant devices." Assistant devices are computing devices that are designed primarily to facilitate human-to-computer dialogs between user(s) and an automated assistant. Many assistant devices take the form of standalone interactive speakers, which are becoming increasingly ubiquitous. Standalone interactive speakers are often placed in heavily trafficked locations such as kitchens, living rooms, conference rooms, etc., and are often interacted with by multiple different people (e.g., family members, co-workers, guests, etc.).

While it may be possible to enroll any individual who ever interacts with the assistant device, doing so may have various disadvantages. Information that is usable to recognize individuals (referred to herein as "distinguishing attributes of a user"), such as "voice profiles" and "visual profiles" described herein, may need to be stored locally on the assistant device. In many cases, assistant devices are resource-constrained (e.g., relatively little memory and/or processing power) for economical and/or technical reasons. Thus, storing data indicative of distinguishing attributes of a large number of users may require an inordinate amount of the assistant device's limited memory. Moreover, if a particular individual's interaction with the assistant device is likely to be minimal—e.g., they are a transient guest visiting a household in which the assistant device is deployed—it may be wasteful to enroll that individual. Additionally, such a transient guest may not wish to be enrolled, e.g., because they'd prefer that data indicative of their distinguishing attributes not be maintained on someone else's assistant device.

Accordingly, in various implementations, before a heretofore unknown individual is enrolled with an automated assistant using techniques described herein, the automated assistant may determine whether the individual satisfies one or more "automated assistant enrollment criteria." These criteria may include, for instance, the individual engaging in a threshold number of distinct human-to-computer dialog sessions with the automated assistant on the same assistant device or on one or more of a coordinated ecosystem of computing devices controlled by a "host" user (e.g., person who controls/configures the ecosystem of devices, such as the owner, head of household, etc.). Additionally or alternatively, these criteria may include a threshold number of dialog turns occurring between the individual and the automated assistant.

To determine whether the individual satisfies the automated assistant enrollment criteria, one or more distinguishing attributes of the individual may be identified, e.g., based on signals generated by one or more hardware sensors integral with or otherwise communicatively coupled with the assistant device. These hardware sensors may include, for example, vision sensors (e.g., cameras, passive infrared sensors, etc.), pressure sensors (e.g., microphone, ultrasonic sensors, etc.), or wireless receivers that can detect wireless signals (e.g., Wi-Fi, Bluetooth, ZigBee, Z-Wave, RFID, visual indicia) emitted by a mobile device carried by the individual. Based on the identified distinguishing attribute(s) of the individual, historical interaction data (e.g., a log maintained by or on behalf of the automated assistant) may be analyzed to identify one or more prior human-to-computer dialog sessions in which the same individual exchanged dialog with the automated assistant (e.g., using the same assistant device or another computing device in the same coordinated ecosystem of computing devices). Based on the analysis, if the automated assistant enrollment criteria are satisfied, then the automated assistant may initiate what will be referred to herein as a "human-to-computer dialog enrollment routine."

During a human-to-computer dialog enrollment routine, the automated assistant may provide natural language output that includes instructions for the user to perform various actions that facilitate recognition of the user in the future, e.g., by capturing and storing data indicative of distinguishing attributes of the user. For example, during a visual enrollment routine, the automated assistant may instruct the user to reposition the user's face to multiple different poses, and capture, using a vision sensor, the user's face in the multiple different poses. Capturing multiple diverse and distinct images of the user's face may enable creation of a "visual profile" of the user. This visual profile may be usable to detect/recognize the user in the future, e.g., using facial recognition processing. In some implementations, the visual profile of the user may include some combination of the multiple images and/or some combination of features extracted from the multiple images. Additionally or alternatively, in some implementations, the visual profile may be "baked into" a machine learning classifier/model (e.g., a convolutional neural network). Future images may be applied as input across such a classifier/model, and output generated based on the model may be indicative of the user's identity.

In addition to or instead of visual enrollment, in some implementations, an automated assistant configured with selected aspects of the present disclosure may trigger a voice enrollment routine. During a voice enrollment routine, the automated assistant may instruct the user to speak various words and/or phrases. These words or phrases may be selected for their suitability for generating a "voice profile" of the user. The user's utterances of these words/phrases may be used to build the voice profile, and the voice profile may be useable, e.g., in conjunction with subsequently captured audio data, to perform speaker recognition. Like visual profiles, voice profiles can take various forms, such as data indicative of utterances of the user, features extracted from utterances of the user, parameters of a trained machine learning classifier/model, etc.

In some implementations, once the user enrolls, an identity of the user (e.g., a unique identifier, the user's name, etc.) may be stored in one or more databases (e.g., local to the assistant device or in remote cloud infrastructure) in association with data indicative of one or more of the distinguishing attributes of the user. In some implementations, these distinguishing features may be stored as "biometric data" associated with the user. In some implementations the biometric data may include an "enrollment" embedding generated from vision/pressure sensor data that is applied as input across a machine learning model, such as various types of neural networks. These distinguishing feature(s) may be detected later, e.g., during subsequent human-to-computer dialog sessions between the user and the automated assistant, and used to determine the user's identity, in effect authenticating the user to the automated assistant.

For example, in some implementations, vision sensor data and/or pressure sensor data that captures a not-yet-recognized individual may be applied across the same machine learning model to generate a new embedding. The new embedding may be compared to a previously-stored enrollment embeddings (e.g., determining Euclidian distances between them) to determine whether the proximate individual's embedding is sufficiently similar to one of the existing enrollment embeddings to reliably match the proximate individual to the previously enrolled individual.

In various implementations, enrollment by the user may unlock one or more features of the automated assistant that were unavailable to the user prior to enrollment. These features may be available to the user upon recognition of the user based on their enrollment. For example, in some implementations, one or more dynamic or custom hot words may be activated such that the user, when later recognized (e.g., using speaker and/or facial recognition), is able to invoke the automated assistant using these dynamic hot words, in addition to or instead of the default hot words that are available to unrecognized users. Additionally or alternatively, in various implementations, other features of (or associated with) the automated assistant may be unlocked to an enrolled user. These may include, for instance, the ability to cause automated assistant to perform one or more actions that might not otherwise be performable at the request of an unenrolled user, such as altering one or more parameters of a smart appliance, accessing protected data, order goods and/or services, making payments, and so forth.

In some implementations, recognition of an enrolled user may generate a confidence measure. For example, in some implementations, users may be requested to enroll for both speaker recognition and facial recognition. Later, when such a user approaches an assistant device, it may be the case that hardware sensors of or associated with the assistant device are unable to capture sufficient data to perform both speaker and facial recognition with a high degree of confidence, e.g., because the camera is malfunctioning, the computing device lacks a camera altogether, the user mumbles or speaks too softly to enable confident speaker recognition, etc. In some such implementations, the user may nonetheless be recognized with a limited degree of confidence. Such a user may be granted limited access to various features of the automated assistant, instead of the full access they might be granted if they were recognized with greater confidence.

For example, in some implementations, detected users may be placed in "levels" or "bins" of trust. A first, or highest, level of trust may be assigned to a user for which facial and/or speaker recognition (or recognition based on a user-emitted wireless signal) generated a confidence measure that satisfies a first threshold. A second level of trust may be assigned to a user for which facial and/or speaker recognition generated a confidence measure that satisfies a second threshold, but not the first threshold. A third level of trust may be assigned to a user for which facial and/or speaker recognition generated a confidence measure that satisfies a third threshold, but not the first or second thresholds. And so on until the user is not recognized at all, in which case they may be assigned a lowest level of trust (e.g., "guest"). In various implementations, each level of trust may unlock various features of the automated assistant for the user. For example, a user assigned to the first level of trust (i.e., voice/speaker recognition generated a relatively high confidence measure) may gain unfettered access to functions of the automated assistant that might be considered sensitive, such as controlling appliances and/or accessing protected data. By contrast, a user assigned to the lowest level of trust may be considered a "guest," and may be denied access altogether or only allowed access to features of the automated assistant that are considered non-sensitive (e.g., weather forecast, sports scores, movies schedules, etc.).

In some implementations, a method performed by one or more processors is provided that includes: executing an automated assistant at least in part on one or more computing devices; processing one or more sensor signals generated by one or more hardware sensors integral with one or more of the computing devices; based on the processing, identifying one or more distinguishing attributes of a user within range of the one or more hardware sensors; based on the one or more distinguishing attributes, analyzing historical interaction data to identify one or more prior human-to-computer dialog sessions in which the user exchanged dialog with the automated assistant using one or more of the computing devices; based on the identified one or more prior human-to-computer dialog sessions, determining that the user satisfies an automated assistant enrollment criterion; and in response to determining that the user satisfies the automated assistant enrollment criterion, engaging in a human-to-computer dialog enrollment routine in which the user is solicited to enroll with the automated assistant, wherein enrollment by the user includes storing an identity of the user in one or more databases in association with data indicative of one or more of the distinguishing attributes of the user, and wherein enrollment by the user unlocks one or more features of the automated assistant that were unavailable to the user prior to enrollment.

In various implementations, the one or more hardware sensors may include a vision sensor, and the one or more distinguishing attributes may include a visual profile of the user. In various implementations, the visual profile of the user may be usable in conjunction with sensor signals generated by the vision sensor or another vision sensor to identify the user using facial recognition processing.

In various implementations, the one or more hardware sensors may include a microphone, and the one or more distinguishing attributes may include a voice profile of the user. In various implementations, the voice profile of the user may be usable in conjunction with a sensor signal generated by the microphone or another microphone to identify the user using speaker recognition processing.

In various implementations, the one or more distinguishing attributes may include a signal emitted by a mobile device carried by the user. In various implementations, the one or more unlocked features may include activation of one or more hot words that are usable to invoke the automated assistant. In various implementations, the one or more unlocked features may include one or more responsive actions performable by the automated assistant. In various implementations, the one or more unlocked features may include access to protected content.

In various implementations, the automated assistant enrollment criterion may include a threshold number of human-to-computer dialog sessions between the user and the automated assistant using one or more of the computing devices. In various implementations, the automated assistant enrollment criterion may include a threshold number of dialog turns in human-to-computer dialog sessions between the user and the automated assistant using one or more of the computing devices.

In various implementations, the human-to-computer dialog routine may include: instructing the user to reposition the user's face to multiple poses; and capturing, using a vision sensor, the user's face in the multiple poses.

In some implementations, a method performed by one or more processors is provided that includes: detecting an initial connection of a computing device to one or more networks. An automated assistant is executed at least in part on the computing device. The method further includes, in response to detecting the initial connection of the computing device to one or more of the networks, engaging in a human-to-computer dialog enrollment routine in which one or more users are solicited to enroll with the automated assistant. The human-to-computer dialog enrollment routine includes identifying an initial user of the computing device, the initial user being identified based on an account of the initial user being associated with the automated assistant being linked with the computing device; determining, based on user interface input received at a user interface of the computing device, whether to associate at least one additional user, of the one or more users, with the automated assistant; processing, based on the user interface input to associate the at least one additional account of the at least one additional user with the automated assistant, one or more sensor signals generated by one or more hardware sensors integral with the computing device. The one or more hardware sensors include at least a vision sensor to capture a current image of the at least one additional user. The human-to-computer dialog enrollment routine further includes enrolling, based on the one or more sensor signals, the at least one additional user with the automated assistant. The enrolling includes storing an association between the at least one additional user and the automated assistant, and the enrolling the at least one additional user includes identifying one or more distinguishing attributes of the at least one additional user to be associated with the automated assistant. One or more of the distinguishing attributes include a visual profile of the at least one additional user created based on the current image.

In various implementations, the method further includes in response to enrolling the at least one additional user with the automated assistant, providing, via the user interface of the computing device, an indication that the account and the at least one additional account are associated with the automated assistant. In various implementations, the visual profile of the at least one additional user is usable in conjunction with further sensor signals generated by the vision sensor or another vision sensor to identify the at least one additional user using facial recognition processing.

In various implementations, enrolling the at least one additional user further includes analyzing the current image to detect faces in the current image, the faces including the initial user and the at least one additional user; and providing, via the user interface of the computing device, an indication of the detected faces in the current image. In some versions of those implementations, enrolling the at least one additional user further includes sequentially providing, via the user interface of the computing device, one or more prompts soliciting an entity to be associated with the at least one additional user. In some further versions of those implementations, soliciting the entity to be associated with the at least one additional user includes determining the at least one additional user is not associated with the automated assistant; and sequentially providing, based on the at least one additional user not being associated with the automated assistant, the one or more prompts to solicit the entity to be associated with the at least one additional user.

In various implementations, enrolling the at least one additional user further includes creating a local account for the at least one additional user of the computing device created during the human-to-computer dialog enrollment routine. In some versions of those implementations, the local account of the at least one additional user is shared with at least one additional computing device connected to the computing device over one or more of the networks.

In various implementations, the method further includes subsequent to enrolling the at least one additional user: receiving, via the user interface of the computing device, a user request, the user request identifying an action to be performed by the automated assistant that is executed at least in part on the computing device; and in response to receiving the user request, performing the action using a parameter that is based on a number of users that were enrolled with the automated assistant during the human-to-computer dialog enrollment routine. The number of users is not explicitly input in relation to the user request.

In some implementations, a method performed by one or more processors is provided that includes, as part of an onboarding routine of a computing device: engaging in a human-to-computer dialog enrollment routine in which one or more users are solicited to enroll with an automated assistant. The automated assistant is executed at least in part on the computing device, and the human-to-computer dialog enrollment routine includes: identifying an initial user of the computing device, the initial user being identified based on an account of the initial user being associated with the automated assistant being linked with the computing device; determining, based on user interface input received at a user interface of the computing device, whether to associate at least one additional user, of the one or more users, with the automated assistant; processing, based on the user interface input to associate the at least one additional account of the at least one additional user with the automated assistant, one or more sensor signals generated by one or more hardware sensors integral with the computing device. The one or more hardware sensors include at least a vision sensor to capture a current image of the at least one additional user. The human-to-computer dialog enrollment routine includes enrolling, based on the one or more sensor signals, the at least one additional user with the automated assistant. The enrolling includes storing an association between the at least one additional user, and the enrolling the at least one additional user includes identifying one or more distinguishing attributes of the at least one additional user to be associated with the automated assistant, wherein one or more of the distinguishing attributes include a visual profile of the at least one additional user created based on the current image.

In various implementations, the method further includes subsequent to completing the onboarding routine of the computing device: receiving, via the user interface of the computing device, a user request, the user request identifying an action to be performed by the automated assistant that is executed at least in part on the computing device; and in response to receiving the user request, performing the action using a parameter that is based on a number of users that were enrolled with the automated assistant during the human-to-computer dialog enrollment routine, wherein the number of users is not explicitly input in relation to the user request. In various implementations, the visual profile of the at least one additional user is usable in conjunction with further sensor signals generated by the vision sensor or another vision sensor to identify the at least one additional user using facial recognition processing.

In various implementations, enrolling the at least one additional user further includes: analyzing the current image to detect faces in the current image, the faces including the initial user and the at least one additional user; and providing, via the user interface of the computing device, an indication of the detected faces in the current image. In some versions of those implementations, enrolling the at least one additional user further includes sequentially providing, via the user interface of the computing device, one or more prompts soliciting an entity to be associated with the at least one additional user. In some further versions of those implementations, soliciting the entity to be associated with the at least one additional user includes: determining the at least one additional user is not associated with the automated assistant; and sequentially providing, based on the at least one additional user not being associated with the automated assistant, the one or more prompts to solicit the entity to be associated with the at least one additional user.

In various implementations, enrolling the at least one additional user further includes creating a local account for the at least one additional user of the computing device created during the human-to-computer dialog enrollment routine. In some versions of those implementations, the local account of the at least one additional user is shared with at least one additional computing device connected to the computing device over one or more of the networks.

In various implementations, the onboarding routine of the computing device is executed in response to receiving an indication to configure the computing device.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
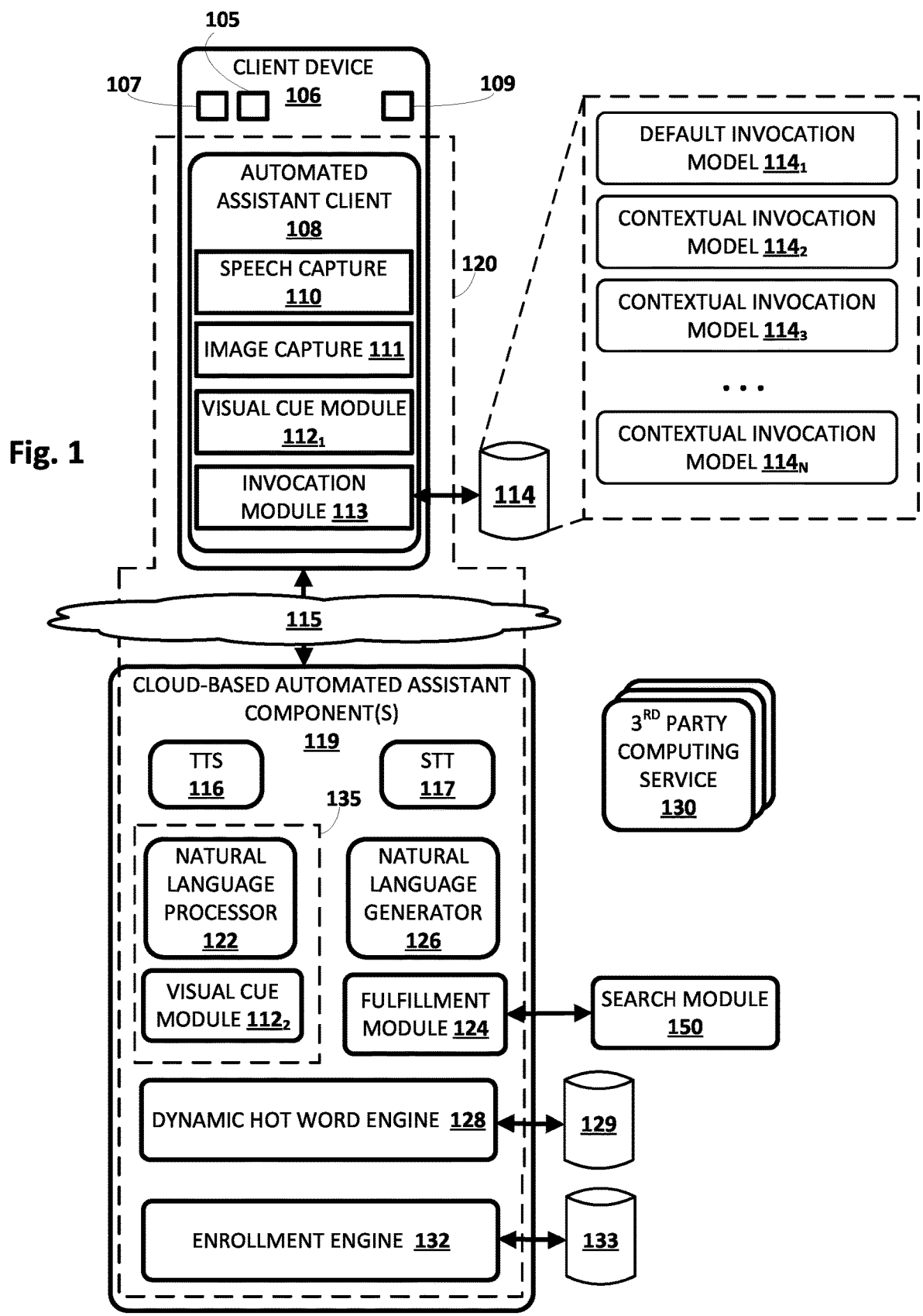
FIG. 1 is a block diagram of an example environment in which implementations disclosed herein may be implemented.

Now turning to FIG. 1, an example environment in which techniques disclosed herein may be implemented is illustrated. The example environment includes one or more client computing devices 106. Each client device 106 may execute a respective instance of an automated assistant client 108, which may also be referred to herein as a "client portion" of an automated assistant. One or more cloud-based automated assistant components 119, which may also be referred to herein collectively as a "server portion" of an automated assistant, may be implemented on one or more computing systems (collectively referred to as a "cloud" computing system) that are communicatively coupled to client devices 106 via one or more local and/or wide area networks (e.g., the Internet) indicated generally at 115.

In various implementations, an instance of an automated assistant client 108, by way of its interactions with one or more cloud-based automated assistant components 119, may form what appears to be, from the user's perspective, a logical instance of an automated assistant 120 with which the user may engage in a human-to-computer dialog. One instance of such an automated assistant 120 is depicted in FIG. 1 in dashed line. It thus should be understood that each user that engages with an automated assistant client 108 executing on a client device 106 may, in effect, engage with his or her own logical instance of an automated assistant 120. For the sakes of brevity and simplicity, the term "automated assistant" as used herein as "serving" a particular (e.g., host) user will refer to the combination of an automated assistant client 108 executing on a client device 106 operated by the user and one or more cloud-based automated assistant components 119 (which may be shared amongst multiple automated assistant clients 108). It should also be understood that in some implementations, automated assistant 120 may respond to a request from any user regardless of whether the user is actually "served" by that particular instance of automated assistant 120.

The one or more client devices 106 may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker (which in some cases may include a vision sensor), a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client computing devices may be provided. Some client devices 106, such as standalone interactive speakers (or "smart speakers"), may take the form of assistant devices that are primarily designed to facilitate dialog between users and automated assistant 120. Some such assistant devices may take the form of a standalone interactive speaker with an attached display, which may or may not be a touchscreen display.

In some implementations, client device 106 may be equipped with one or more vision sensors 107 having one or more fields of view, although this is not required. Vision sensor(s) 107 may take various forms, such as digital cameras, passive infrared ("PIR") sensors, stereoscopic cameras, RGBd cameras, etc. The one or more vision sensors 107 may be used, e.g., by an image capture module 111, to capture image frames (still images or video) of an environment in which client device 106 is deployed. These image frames may then be analyzed, e.g., by a visual cue module $112_1$, to detect user-provided visual cues contained in the image frames. These visual cues may include but are not limited to hand gestures, gazes towards particular reference points, facial expressions, predefined movements by users, etc. These detected visual cues may be used for various purposes, such as invoking automated assistant 120 and/or causing automated assistant 120 to take various actions.

Additionally or alternatively, in some implementations, client device 106 may include one or more proximity sensors 105. Proximity sensor(s) may take various forms, such as passive infrared ("PIR") sensors, radio frequency identification ("RFID"), a component that receives a signal emitted from another nearby electronic component (e.g., Bluetooth signal from a nearby user's client device, high- or low-frequency sounds emitted from the devices, etc.), and so forth. Additionally or alternatively, vision sensors 107 and/or a microphone 109 may also be used as proximity sensors, e.g., by visual and/or audibly detecting that a user is proximate.

As described in more detail herein, automated assistant 120 engages in human-to-computer dialog sessions with one or more users via user interface input and output devices of one or more client devices 106. In some implementations, automated assistant 120 may engage in a human-to-computer dialog session with a user in response to user interface input provided by the user via one or more user interface input devices of one of the client devices 106. In some of those implementations, the user interface input is explicitly directed to automated assistant 120. For example, a user may verbally provide (e.g., type, speak) a predetermined invocation phrase, such as "OK, Assistant," or "Hey, Assistant," to cause automated assistant 120 to begin actively listening or monitoring typed text. Additionally or alternatively, in some implementations, automated assistant 120 may be invoked based on one or more detected visual cues, alone or in combination with oral invocation phrases.

In many implementations, automated assistant 120 may utilize speech recognition to convert utterances from users into text, and respond to the text accordingly, e.g., by providing search results, general information, and/or taking one or more responsive actions (e.g., playing media, launching a game, ordering food, etc.). In some implementations, the automated assistant 120 can additionally or alternatively respond to utterances without converting the utterances into text. For example, the automated assistant 120 can convert voice input into an embedding, into entity representation(s) (that indicate entity/entities present in the voice input), and/or other "non-textual" representation and operate on such non-textual representation. Accordingly, implementations described herein as operating based on text converted from voice input may additionally and/or alternatively operate on the voice input directly and/or other non-textual representations of the voice input.

Each of client computing device 106 and computing device(s) operating cloud-based automated assistant components 119 may include one or more memories for storage of data and software applications, one or more processors for accessing data and executing applications, and other components that facilitate communication over a network. The operations performed by client computing device 106 and/or by automated assistant 120 may be distributed across multiple computer systems. Automated assistant 120 may be implemented as, for example, computer programs running on one or more computers in one or more locations that are coupled to each other through a network.

As noted above, in various implementations, client computing device 106 may operate an automated assistant client 108, or "client portion" of automated assistant 120. In various implementations, automated assistant client 108 may include a speech capture module 110, the aforementioned image capture module 111, a visual cue module $112_1$, and/or an invocation module 113. In other implementations, one or more aspects of speech capture module 110, image capture module 111, visual cue module 112, and/or invocation module 113 may be implemented separately from automated assistant client 108, e.g., by one or more cloud-based automated assistant components 119. For example, in FIG. 1, there is also a cloud-based visual cue module $112_2$ that may detect visual cues in image data.

In various implementations, speech capture module 110, which may be implemented using any combination of hardware and software, may interface with hardware such as a microphone 109 to capture an audio recording of a user's utterance(s). Various types of processing may be performed on this audio recording for various purposes. In some implementations, image capture module 111, which may be implemented using any combination of hardware or software, may be configured to interface with camera 107 to capture one or more image frames (e.g., digital photographs) that correspond to a field of view of the vision sensor 107.

In various implementations, visual cue module $112_1$ (and/or cloud-based visual cue module $112_2$) may be implemented using any combination of hardware or software, and may be configured to analyze one or more image frames provided by image capture module 111 to detect one or more visual cues captured in and/or across the one or more image frames. Visual cue module $112_1$ may employ a variety of techniques to detect visual cues. For example, Visual cue module $112_2$ may use one or more artificial intelligence (or machine learning) models that are trained to generate output indicative of detected user-provided visual cues in image frames.

Speech capture module 110 may be configured to capture a user's speech, e.g., via a microphone 109, as mentioned previously. Additionally or alternatively, in some implementations, speech capture module 110 may be further configured to convert that captured audio to text and/or to other representations or embeddings, e.g., using speech-to-text ("STT") processing techniques. Additionally or alternatively, in some implementations, speech capture module 110 may be configured to convert text to computer-synthesized speech, e.g., using one or more voice synthesizers. However, in some cases, because client device 106 may be relatively constrained in terms of computing resources (e.g., processor cycles, memory, battery, etc.), speech capture module 110 local to client device 106 may be configured to convert a finite number of different spoken phrases—particularly phrases that invoke automated assistant 120—to text (or to other forms, such as lower dimensionality embeddings). Other speech input may be sent to cloud-based automated assistant components 119, which may include a cloud-based text-to-speech ("TTS") module 116 and/or a cloud-based STT module 117.

In various implementations, invocation module 113 may be configured to determine whether to invoke automated assistant 120, e.g., based on output provided by speech capture module 110 and/or visual cue module $112_1$ (which in some implementations may be combined with image capture module 111 in a single module). For example, invocation module 113 may determine whether a user's utterance qualifies as an invocation phrase that should initiate a human-to-computer dialog session with automated assistant 120. In some implementations, invocation module 113 may analyze data indicative of the user's utterance, such as an audio recording or a vector of features extracted from the audio recording (e.g., an embedding), alone or in conjunction with one or more visual cues detected by visual cue module $112_1$. In some implementations, a threshold that is employed by invocation module 113 to determine whether to invoke automated assistant 120 in response to a vocal utterance may be lowered when particular visual cues are also detected, or when the speaker is recognized as an enrolled user. Consequently, even when a user provides a vocal utterance that is different from but somewhat phonetically similar to the proper invocation phrase, "OK assistant," that utterance may nonetheless be accepted as a proper invocation when detected in conjunction with a visual cue (e.g., hand waving by the speaker, speaker gazes directly into vision sensor 107, etc.) or detected from an enrolled user.

In some implementations, one or more on-device invocation models, e.g., stored in an on-device model database 114, may be used by invocation module 113 to determine whether an utterance and/or visual cue(s) qualify as an invocation. Such an on-device invocation model may be trained to detect variations of invocation phrases/gestures. For example, in some implementations, the on-device invocation model (e.g., one or more neural networks) may be trained using training examples that each include an audio recording (or an extracted feature vector) of an utterance from a user, as well as data indicative of one or more image frames and/or detected visual cues captured contemporaneously with the utterance.

In FIG. 1, on-device model database 114 may store one or more on-device invocation models $114_1$-$114_N$. In some implementations, a default on-device invocation model $114_1$ may be trained to detect, in an audio recording or other data indicative thereof, one or more default invocation phrases or hot word(s), such as those mentioned previously (e.g., "OK Assistant," "Hey, Assistant," etc.). In some such implementations, these models may always be available and usable to transition automated assistant 120 into a general listening state in which any audio recording captured by speech capture module 110 (at least for some period of time following invocation) may be processed using other components of automated assistant 120 as described below (e.g., on client device 106 or by one or more cloud-based automated assistant components 119).

Additionally, in some implementations, on-device model database 114 may store, at least temporarily, one or more additional "contextual invocation models" $114_2$-$114_N$. These contextual invocation models $114_2$-$114_N$ may be used by and/or available to (e.g., activated) invocation module 113 in specific contexts, such as when an enrolled user is detected. Contextual invocation models $114_2$-$114_N$ may be trained to detect, e.g., in an audio recording or other data indicative thereof, one or more context-specific hot words. In some implementations, contextual invocation models $114_2$-$114_N$. may be selectively downloaded on an as-needed basis, e.g., from a dynamic hot word engine 128 that forms part of cloud-based automated assistant components 119, as will be described in more detail below. In some implementations, each contextual invocation model 114 may be available for use by a different enrolled user (recognition of a speaker as an enrolled user may constitute a "context" as used herein). Thus, each enrolled user may be able to customize their own library of invocation phrases.

In various implementations, when invocation module 113 detects various dynamic hot words using contextual invocation models $114_2$-$114_N$, it may transition automated assistant 120 into the general listening state described previously. Additionally or alternatively, invocation module 113 may transition automated assistant 120 into a context-specific state in which one or context-specific responsive actions are performed with or without transitioning automated assistant 120 into the general listening state. In many cases, the audio data that triggered transition of automated assistant 120 into a context-specific state may not be transmitted to the cloud. Instead, one or more context-specific responsive actions may be performed entirely on client device 106, which may reduce both the response time and the amount of information that is transmitted to the cloud, which may be beneficial from a privacy standpoint.

Cloud-based TTS module 116 may be configured to leverage the virtually limitless resources of the cloud to convert textual data (e.g., natural language responses formulated by automated assistant 120) into computer-generated speech output. In some implementations, TTS module 116 may provide the computer-generated speech output to client device 106 to be output directly, e.g., using one or more speakers. In other implementations, textual data (e.g., natural language responses) generated by automated assistant 120 may be provided to speech capture module 110, which may then convert the textual data into computer-generated speech that is output locally.

Cloud-based STT module 117 may be configured to leverage the virtually limitless resources of the cloud to convert audio data captured by speech capture module 110 into text, which may then be provided to intent matcher 135. In some implementations, cloud-based STT module 117 may convert an audio recording of speech to one or more phonemes, and then convert the one or more phonemes to text. Additionally or alternatively, in some implementations, STT module 117 may employ a state decoding graph. In some implementations, STT module 117 may generate a plurality of candidate textual interpretations of the user's utterance. In some implementations, STT module 117 may weight or bias particular candidate textual interpretations higher than others depending on whether there are contemporaneously detected visual cues.

Automated assistant 120 (and in particular, cloud-based automated assistant components 119) may include intent matcher 135, the aforementioned TTS module 116, the aforementioned STT module 117, and other components that are described in more detail below. In some implementations, one or more of the modules and/or modules of automated assistant 120 may be omitted, combined, and/or implemented in a component that is separate from automated assistant 120. In some implementations, to protect privacy, one or more of the components of automated assistant 120, such as natural language processor 122, TTS module 116, STT module 117, etc., may be implemented at least on part on client devices 106 (e.g., to the exclusion of the cloud).

In some implementations, automated assistant 120 generates responsive content in response to various inputs generated by a user of one of the client devices 106 during a human-to-computer dialog session with automated assistant 120. Automated assistant 120 may provide the responsive content (e.g., over one or more networks when separate from a client device of a user) for presentation to the user as part of the dialog session. For example, automated assistant 120 may generate responsive content in response to free-form natural language input provided via client device 106. As used herein, free-form input (also referred to as "free-form natural language input" or "natural language input") is input that is formulated by a user and that is not constrained to a group of options presented for selection by the user.

As used herein, a "dialog session" may include a logically-self-contained exchange of one or more messages between a user and automated assistant 120 (and in some cases, other human participants). Automated assistant 120 may differentiate between multiple dialog sessions with a user based on various signals, such as passage of time between sessions, change of user context (e.g., location, before/during/after a scheduled meeting, etc.) between sessions, detection of one or more intervening interactions between the user and a client device other than dialog between the user and the automated assistant (e.g., the user switches applications for a while, the user walks away from then later returns to a standalone voice-activated product), locking/sleeping of the client device between sessions, change of client devices used to interface with one or more instances of automated assistant 120, and so forth.

An intent matcher 135 may be configured to determine a user's intent based on input(s) (e.g., vocal utterances, visual cues, etc.) provided by the user and/or based on other signals, such as sensor signals, online signals (e.g., data obtained from web services), and so forth. In some implementations, intent matcher 135 may include a natural language processor 122 and the aforementioned cloud-based visual cue module $112_2$. In various implementations, cloud-based visual cue module $112_2$ may operate similarly to visual cue module $112_1$ except that cloud-based visual cue module $112_2$ may have more resources at its disposal. In particular, cloud-based visual cue module $112_2$ may detect visual cues that may be used by intent matcher 135, alone or in combination with other signals, to determine a user's intent. In some implementations in which the speaker is recognized as an enrolled user, an evolving context of an ongoing conversation between the enrolled user and automated assistant 120 may be leveraged to respond to natural language inputs of the user. For example, an enrolled user's natural language input may be automatically disambiguated based on a conversation history between the enrolled user and automated assistant 120. This conversation history may not be available to other enrolled users or to other users at large.

Natural language processor 122 may be configured to process natural language input generated by user(s) via client device 106 and may generate annotated output (e.g., in textual form) for use by one or more other components of automated assistant 120. For example, the natural language processor 122 may process natural language free-form input that is generated by a user via one or more user interface input devices of client device 106. The generated annotated output includes one or more annotations of the natural language input and one or more (e.g., all) of the terms of the natural language input.

In some implementations, the natural language processor 122 is configured to identify and annotate various types of grammatical information in natural language input. For example, the natural language processor 122 may include a morphological module that may separate individual words into morphemes and/or annotate the morphemes, e.g., with their classes. Natural language processor 122 may also include a part of speech tagger configured to annotate terms with their grammatical roles. For example, the part of speech tagger may tag each term with its part of speech such as "noun," "verb," "adjective," "pronoun," etc. Also, for example, in some implementations the natural language processor 122 may additionally and/or alternatively include a dependency parser (not depicted) configured to determine syntactic relationships between terms in natural language input. For example, the dependency parser may determine which terms modify other terms, subjects and verbs of sentences, and so forth (e.g., a parse tree)—and may make annotations of such dependencies.

In some implementations, the natural language processor 122 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 122 may rely on annotations from one or more other components of the natural language processor 122. For example, in some implementations a named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 122 may use related prior input and/or other related data outside of the particular natural language input to determine one or more annotations.

Intent matcher 135 may use various techniques to determine an intent of the user, e.g., based on output from natural language processor 122 (which may include annotations and terms of the natural language input) and/or based on output from visual cue module (e.g., 112$_1$ and/or 112$_2$). In some implementations, intent matcher 135 may have access to one or more databases (not depicted) that include, for instance, a plurality of mappings between grammars, visual cues, and responsive actions (or more generally, intents). In many cases, these grammars may be selected and/or learned over time, and may represent the most common intents of users.

For example, one grammar, "play <artist>", may be mapped to an intent that invokes a responsive action that causes music by the <artist> to be played on the client device 106 operated by the user. Another grammar, "[weather|forecast] today," may be match-able to user queries such as "what's the weather today" and "what's the forecast for today?"

In addition to or instead of grammars, in some implementations, intent matcher 135 may employ one or more trained machine learning models, alone or in combination with one or more grammars and/or visual cues. These trained machine learning models may also be stored in one or more databases and may be trained to identify intents, e.g., by embedding data indicative of a user's utterance and/or any detected user-provided visual cues into a reduced dimensionality space, and then determining which other embeddings (and therefore, intents) are most proximate, e.g., using techniques such as Euclidean distance, cosine similarity, etc.

As seen in the "play <artist>" example grammar, some grammars have slots (e.g., <artist>) that can be filled with slot values (or "parameters"). Slot values may be determined in various ways. Often users will provide the slot values proactively. For example, for a grammar "Order me a <topping> pizza," a user may likely speak the phrase "order me a sausage pizza," in which case the slot <topping> is filled automatically. Additionally or alternatively, if a user invokes a grammar that includes slots to be filled with slot values, without the user proactively providing the slot values, automated assistant 120 may solicit those slot values from the user (e.g., "what type of crust do you want on your pizza?"). In some implementations, slots may be filled with slot values based on visual cues detected by visual cue modules 112$_{1-2}$. For example, a user could utter something like "Order me this many cat bowls" while holding up three fingers to visual sensor 107 of client device 106. Or, a user could utter something like "Find me more movies like this" while holding of a DVD case for a particular movie.

In some implementations, automated assistant 120 may serve as an intermediary between users and one or more third party computing services 130 (or "third party agents", or "agents"). These third party computing services 130 may be independent software processes that receive input and provide responsive output. Some third party computing services may take the form of third party applications that may or may not operate on computing systems that are separate from those that operate, for instance, cloud-based automated assistant components 119. One kind of user intent that may be identified by intent matcher 135 is to engage a third party computing service 130. For example, automated assistant 120 may provide access to an application programming interface ("API") to a service for controlling a smart device. A user may invoke automated assistant 120 and provide a command such as "I'd like to turn the heating on." Intent matcher 135 may map this command to a grammar that triggers automated assistant 120 to engage with the third party service, thereby to cause the user's heating to be switched on. The third party service 130 may provide automated assistant 120 with a minimum list of slots that need to be filled in order to fulfill (or "resolve") a command to turn the heating on. In this example, the slots may include the temperature to which the heating is to be set, and a duration for which the heating is to be on. Automated assistant 120 may generate and provide to the user (via client device 106) natural language output that solicits parameters for the slots.

Fulfillment module 124 may be configured to receive the predicted/estimated intent that is output by intent matcher 135, as well as an associated slot values (whether provided by the user proactively or solicited from the user) and fulfill (or "resolve") the intent. In various implementations, fulfillment (or "resolution") of the user's intent may cause various fulfillment information (also referred to as "responsive" information or "resolution information") to be generated/obtained, e.g., by fulfillment module 124. As will be described below, the fulfillment information may in some implementations be provided to a natural language generator ("NLG" in some FIGS. 126, which may generate natural language output based on the fulfillment information.

Fulfillment (or "resolution") information may take various forms because an intent can be fulfilled (or "resolved") in a variety of ways. Suppose a user requests pure information, such as "Where were the outdoor shots of 'The Shining' filmed?" The intent of the user may be determined, e.g., by intent matcher 135, as being a search query. The intent and content of the search query may be provided to fulfillment module 124, which as depicted in FIG. 1 may be in communication with one or more search modules 150 configured to search corpuses of documents and/or other data sources (e.g., knowledge graphs, etc.) for responsive information. Fulfillment module 124 may provide data indicative of the search query (e.g., the text of the query, a reduced dimensionality embedding, etc.) to search module 150. Search module 150 may provide responsive information, such as GPS coordinates, or other more explicit information, such as "Timberline Lodge, Mt. Hood, Oregon." This responsive information may form part of the fulfillment information generated by fulfillment module 124.

Additionally or alternatively, fulfillment module 124 may be configured to receive, e.g., from intent matcher 135, a user's intent and any slot values provided by the user or determined using other means (e.g., GPS coordinates of the user, user preferences, etc.) and trigger a responsive action. Responsive actions may include, for instance, ordering a good/service, starting a timer, setting a reminder, initiating a phone call, playing media, sending a message, etc. In some such implementations, fulfillment information may include slot values associated with the fulfillment, confirmation responses (which may be selected from predetermined responses in some cases), etc.

Natural language generator 126 may be configured to generate and/or select natural language output (e.g., words/phrases that are designed to mimic human speech) based on data obtained from various sources. In some implementations, natural language generator 126 may be configured to receive, as input, fulfillment information associated with fulfillment of an intent, and to generate natural language output based on the fulfillment information. Additionally or alternatively, natural language generator 126 may receive information from other sources, such as third party applications (e.g., required slots), which it may use to compose natural language output for the user.

In some implementations, an enrollment engine 132 may be configured to perform selected aspects of the present disclosure relating to dialog-based enrollment of individual users for single- and/or multi-modal recognition by an automated assistant, as well as determining how to respond to a particular user's request based on the particular user being enrolled and/or recognized. In some implementations, enrollment engine 132 may be operably coupled with an enrollment database 133 that stores information about enrolled users that can be used to authentic enrolled users with automated assistant 120.

Enrollment database 133 may include various information about enrolled users, such as distinguishing visual and/or audible attributes of enrolled users. For example, enrollment database 133 may store, for instance, visual and/or voice profiles of enrolled users. In some implementations, enrollment database 133 may be hosted in the cloud, e.g., on the same or different computing system as cloud-based automated assistant components 119. In some such implementations, information stored in enrollment database 133 may be associated with particular client devices and/or particular users with which the enrolled users are enrolled. Additionally or alternatively, in some implementations, enrollment database 133 (and in some cases, all or parts of enrollment engine 132) may be hosted on client device 106, e.g., so that users can be enrolled and/or enrolled users can be authenticated using resources local to client device 106, rather than cloud-based resources.

Enrollment database 133 (or another database) may also store what will be referred to herein as "historical interaction data." This information may be usable by enrollment engine 132 to determine whether to solicit a particular individual to enroll with automated assistant 120 using techniques described herein. Historical interaction data may include information indicative of past interactions between automated assistant 120 and various individuals. In some implementations, historical interaction data may include data indicative of distinguishing attributes of these individuals, such as temporary voice and/or visual profiles.

By maintaining this information in enrollment database 133 over time, enrollment engine 132 may be able to determine that heretofore unidentified individuals have satisfied one or more "automated assistant enrollment criteria." Automated assistant enrollment criteria may include, for instance, the individual engaging in a threshold number of distinct human-to-computer dialog sessions with automated assistant 120 on the same client device 106 or on one or more of a coordinated ecosystem of client devices. Additionally or alternatively, automated assistant enrollment criteria may include a threshold number of dialog turns occurring between the individual and the automated assistant.

Once the automated assistant enrollment criteria is determined to be satisfied for a particular speaker, automated assistant 120 may initiate what is referred to herein as a "human-to-computer dialog enrollment routine." During a human-to-computer dialog enrollment routine, automated assistant 120 may provide natural language output that includes instructions for the user to perform various actions that facilitate recognition of the user in the future, e.g., by capturing and storing data indicative of distinguishing attributes of the user. For example, automated assistant 120 may instruct the individual to move their head to various poses so that enrollment engine 132, e.g., using image(s) captured by camera 107, may use to establish a "visual" profile of the individual. Additionally or alternatively, automated assistant 120 may instruct the individual to speak one or more words or phrases that enrollment engine 132, e.g., using audio data captured by microphone 109, may use to establish an "audible" profile of the individual. These visual and/or audible profiles may be stored in enrollment database 133 and used to authenticate the speaker in the future.

In various implementations, enrollment engine 132 may be configured to process one or more sensor signals generated by one or more hardware sensors (e.g., 105-109) integral with client device 106. Based on the processing, enrollment engine 132 may be configured to identify one or more distinguishing attributes of a user within range of the one or more hardware sensors. Based on the one or more distinguishing attributes, enrollment engine 132 may analyze historical interaction data (e.g., stored in enrollment database 133) to identify one or more prior human-tocomputer dialog sessions in which the user exchanged dialog with automated assistant 120. For example, in some implementations, enrollment database 133 may include voice and/or visual profile information gathered from prior interactions with unknown users. This voice and/or visual profile information may include, for instance, an audio recording captured by microphone 109 during the last interaction with the unknown user, one or more digital images captured of the unknown user using camera 107, a combination of both, or one or more embeddings generated from the audio recording and/or digital image(s).

Based on the identified one or more prior human-to-computer dialog sessions, enrollment engine 132 may determine that the user satisfies an automated assistant enrollment criterion. For example, in some implementations, the automated assistant enrollment criteria may include the user engaging with the automated assistant more than once, more than twice, or more than n times (n being a positive integer). Additionally or alternatively, the automated assistant enrollment criteria may include the unknown user engaging with automated assistant 120 more than some threshold number of times during a predetermined time interval, such as during a week, ten days, a month, a quarter, a day, an hour, etc. Additionally or alternatively, the automated assistant enrollment criteria may include the unknown user engaging in some threshold number of dialog turns with automated assistant 120, e.g., in a single dialog session and/or across multiple dialog sessions. In some such implementations, if a particular unknown user's voice and/or face is not detected again within the predetermined time interval, it may be erased (e.g., from enrollment database 133). And in some implementations, all or a portion of enrollment database 133 may be stored only on client device 106, e.g., to preserve the privacy of the unknown user(s).

In various implementations, once enrollment engine 132 determines that the user satisfies the automated assistant enrollment criterion, enrollment engine 132 may trigger and/or engage in a human-to-computer dialog enrollment routine. During the human-to-computer dialog enrollment routine, the heretofore unknown user may be solicited, e.g., by automated assistant using audio and/or visual output, to enroll with automated assistant 120. In some implementations, enrollment by the user may include storing an identity of the user (which may be provided by the user in some cases) in one or more databases (e.g., 133) in association with data indicative of one or more of the distinguishing attributes of the user (e.g., a voice profile and/or visual profile). In some implementations, the newly-enrolled user may be matched to a preexisting online profile, e.g., that the newly-enrolled user uses to engage with his or her own instance of automated assistant 120.

In various implementations, enrollment by the user by enrollment engine 132 may unlock one or more features of automated assistant 120 that were unavailable to the user prior to enrollment. For example, an enrolled user may be able to invoke automated assistant 120 using hot word(s) in one or more of contextual invocation models 114. In some such implementations, the newly enrolled user may be able to customize their own library of hot words that they can use in the future to invoke automated assistant. As another example, enrolled users may be provided various levels of trust, e.g., by a controlling or "host" user who controls/owns client device 106. For example, an unknown user may be able to engage with automated assistant 120 using client device 106, but may not be able to cause automated assistant 120 to perform various actions, such as accessing calendars and/or other documents controlled by the host user, or controlling smart appliances such as smart lights and/or thermostats. By contrast, an enrolled user may be placed into one or more levels of trust, each level gaining the enrolled user access to various resources and/or features such as those just mentioned.

Figure 2:
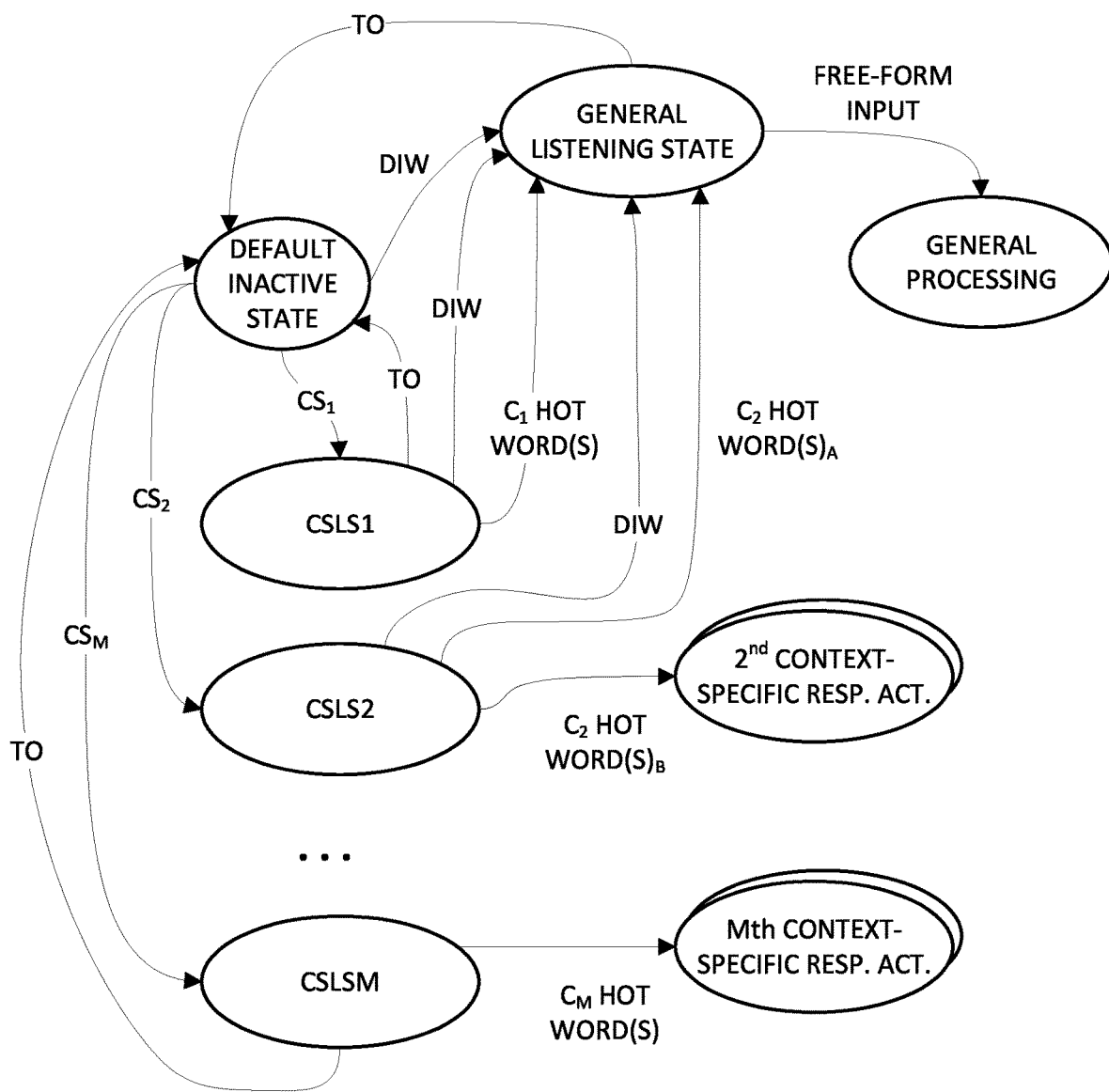
FIG. 2 depicts an example of a state machine that may be implemented by an automated assistant configured with selected aspects of the present disclosure, in accordance with various implementations.

FIG. 2 schematically depicts an example state machine that may be implemented by an automated assistant (e.g., 120) and/or an assistant device (e.g., 106) configured with selected aspects of the present disclosure, in accordance with various implementations. At top left is a "default inactive state" in which automated assistant 120 may reside when not being engaged by a user. In the default inactive state, one or more microphones of one or more client devices (106) may be activated, and audio data it captures may be analyzed using techniques described herein. Automated assistant 120 may be transitioned into a "general listening state" in response to detection, e.g., by invocation module 113 and/or visual cue module 112 based on default invocation model $114_1$, of one or more default invocation words ("DIW" in FIG. 2, also referred to herein as "hot words"), such as "OK, Assistant," or "Hey, Assistant." Utterances other than the default hot words (e.g., ambient conversation, etc.) may be ignored and not processed.

In the general listening state, automated assistant 120 may capture audio data uttered after the default invocation word(s) and transition into a "general processing" state. In the general processing state, automated assistant 120 may process data indicative of audio input as described previously with respect to FIG. 1, including STT processing, natural language processing, intent matching, fulfillment, etc. Once the processing is complete, automated assistant 120 may transition back into the default inactive state. If no audio input is received after detection of the default invocation word(s), then a timeout ("TO" in FIG. 2) may transition automated assistant 120 from the general listening state back into the default inactive state, e.g., so that later utterances not intended for processing by automated assistant are not captured or processed.

As noted previously, techniques described herein facilitate context-specific hot words that can be activated and detected to transition automated assistant 120 to a variety of different states, such as the general listening state or to other context-specific states in which automated assistant 120 performs various actions. In some implementations, in certain contexts, the vocabulary of invocation words that can be uttered to transition automated assistant 120 from the default inactive state to the general listening state may be expanded, at least temporarily (e.g., for a limited amount of time, until the context is no longer applicable, etc.).

For example, in FIG. 2, a first context-specific signal $CS_1$ may transition automated assistant 120 from the default inactive state into a first context-specific listening state, "CSLS1." In CSLS1, automated assistant 120 may listen for both default invocation word(s) ("DIW") and first context-specific hot words ("$C_1$ hot words"). If either are detected, automated assistant 120 may transition to the general listening state as described above. Thus, in the first context-specific listening state, the vocabulary of hot words that will transition automated assistant 120 into the general listening state is expanded to include both the default invocation word(s) and the first context-specific hot words. Also, in some implementations, if a sufficient amount of time passes while automated assistant 120 is in the first context-specific listening state without detection of activated hot words, then a timeout ("TO") may transition automated assistant 120 back into the default inactive state.

Additionally or alternatively, in some implementations, in certain contexts, automated assistant 120 may be transitionable into either the general listening state, e.g., using an expanded vocabulary of hot words, or into a context-specific state in which one or context-specific actions may be performed. For example, in FIG. 2, automated assistant 120 may be transitioned from the default inactive state into a second context-specific listening state, "CSLS2," in response to a second contextual signal ("$CS_2$"). In this second context-specific listening state, automated assistant 120 may be transitioned to the general listening state, e.g., by detecting one or more default invocation words and/or in some cases, one or more second context-specific hot words ("C2 hot word(s)$_A$") that effectively expand the vocabulary that is usable to transition automated assistant 120 into the general listening state.

Additionally or alternatively, automated assistant 120 may be transitioned from the second context-specific state ("CSLS2") into one or more states in which one or more second context-specific responsive actions ("$2^{nd}$ context-specific resp. act.") are performed, e.g., in response to one or more additional second context-specific hot words ("C2 hot word(s)$_B$"). In some implementations, specific second-context hot words may be mapped to specific second-context specific responsive actions, though this is not required. Although not depicted in FIG. 2 for the sake of clarity, in some implementations, after performance of these one or more second context-specific responsive actions, automated assistant 120 may transition back into the default inactive state.

In some implementations, in certain contexts, automated assistant 120 may no longer listen for the default hot words. Instead, automated assistant 120 may only listen for context-specific hot words and perform responsive actions. For example, in FIG. 2, automated assistant 120 may be transitioned from the default inactive state into an Mth context-specific listening state (M is a positive integer), "CSLSM," in response to an Mth contextual signal ("$CS_M$"). In this state, automated assistant 120 may listen for Mth context-specific hot words ("$C_M$ hot word(s)"). In response to detecting one or more Mth context-specific hot words, automated assistant 120 may perform one or more Mth context-specific responsive actions ("Mth context-specific resp. act.").

In various implementations, automated assistant 120 may activate context-specific hot words in various ways. For example, and referring to both FIGS. 1 and 2, in some implementations, upon transition into a specific context, automated assistant 120 may download, e.g., from dynamic hot word engine 128, one or more context-specific machine learning models or classifiers (e.g., $114_2$, $114_3$, ..., $114_N$), such as neural networks, hidden Markov models, etc., that are pre-trained to detect hot words that are to be activated in that particular context. For example, suppose that in a particular context, a vocabulary that transitions automated assistant 120 from the default inactive state to the general listening state is expanded to include the word, "howdy." In various implementations, automated assistant 120 may obtain, e.g., from a database 129 available to dynamic hot word engine 128, a classifier that is trained to generate output indicative of whether the word "howdy" was detected. In various implementations this classifier may be binary (e.g., output "1" if the hot word is detected, "0" otherwise), or may generate a probability. If the probability satisfies some confidence threshold, then the hot word may be detected.

Figure 3A:
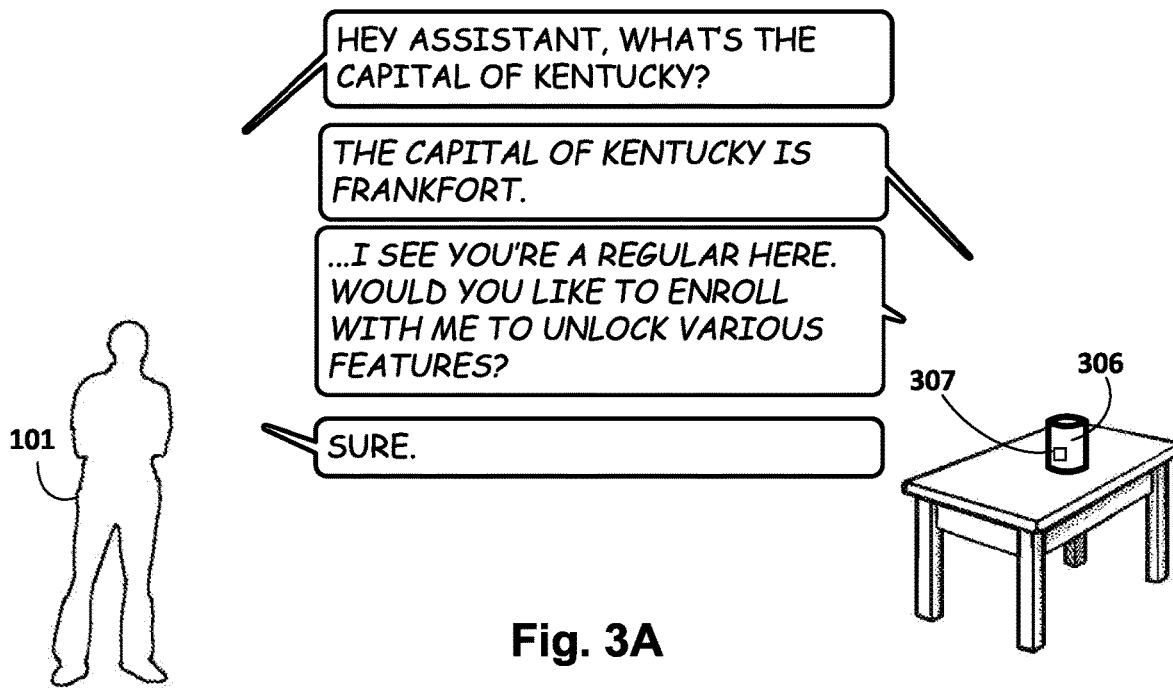
FIG. 3A, FIG. 3B, FIG. 4A, and FIG. 4B depict additional example scenarios in which disclosed techniques may be employed.
Figure 3B:
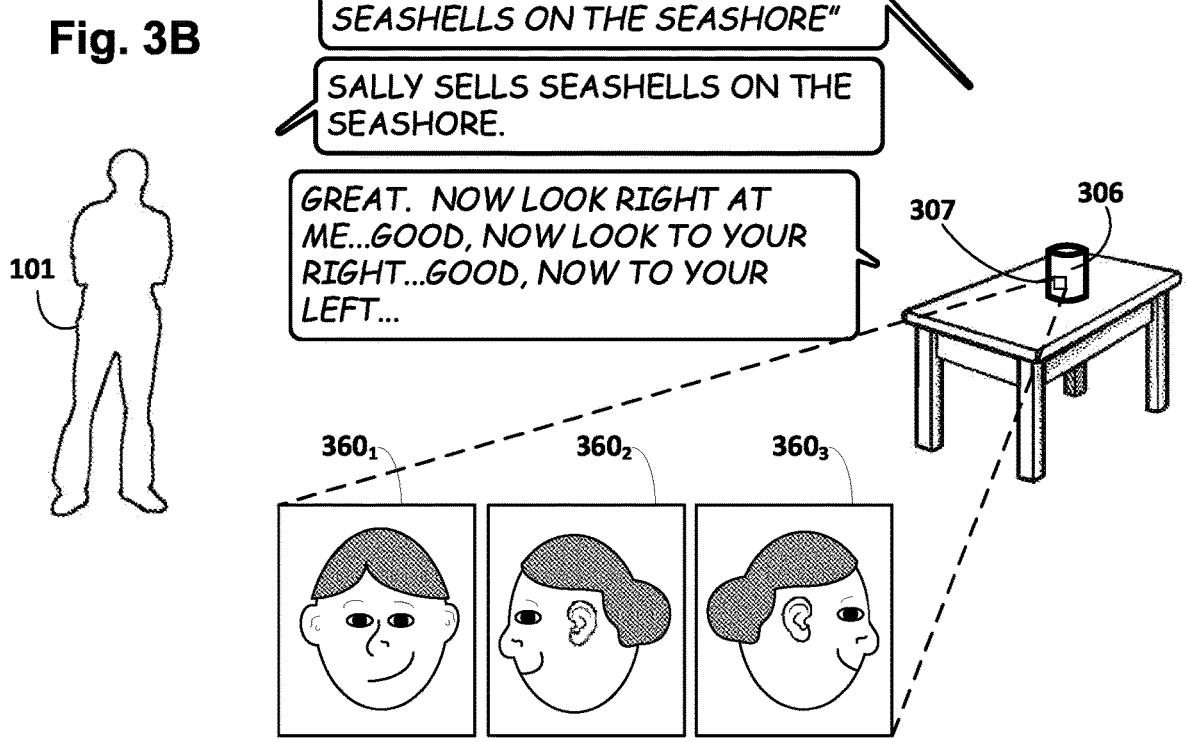

FIGS. 3A and 3B demonstrate one example of how a human-to-computer dialog session between and unknown user 101 and an instance of automated assistant (not depicted in FIGS. 3A-B) may occur, via the microphone(s) and speaker(s) of a client computing device 306 (depicted as a standalone interactive speaker but this is not meant to be limiting) according to implementations described herein. One or more aspects of automated assistant 120 may be implemented on the computing device 306 and/or on one or more computing devices that are in network communication with the computing device 306. Client device 306 includes a camera 307, and also may include a microphone (not depicted in FIGS. 3A-3B, see FIG. 1).

In FIG. 3A, user 101 invokes automated assistant 120 with the default invocation phrase, "Hey, Assistant." Then, user provides spoken natural language input, "What is the capital of Kentucky?" Because this request seeks non-sensitive, public information, automated assistant 120 performs a search and responds, "The capital of Kentucky is Frankfort." Next, automated assistant 120, e.g., by way of enrollment engine 132, determines whether the unknown user 101 has yet satisfied automated assistant enrollment criteria. For example, automated assistant 120 may compare an audio recording of what user 101 said with one or more voice profiles stored in enrollment database 133 in association with one or more unknown speakers. Additionally or alternatively, automated assistant 120 may compare one or more digital images captured by camera 307 with one or more visual profiles (e.g., digital images, embeddings thereof, etc.) stored in enrollment engine 133 in association with one or more unknown speakers.

In this example, automated assistant 120 determines that user 101 has satisfied the automated assistant criteria (e.g., because this is the nth time user 101 has been detected engaging with automated assistant 120). Accordingly, automated assistant solicits the user to engage in an enrollment routine, " . . . I see you're a regular here. Would you like to enroll with me to unlock various features?" User 101 responds in the affirmative.

In FIG. 3B, the enrollment routine is commenced. Automated assistant 120 prompts the user as follows, "Repeat after me: 'Sally sells seashells on the seashore'". The audible response by user 101 provides enrollment engine 132 with audio data that it can analyze to form a robust voice profile that automated assistant 120 can use in the future to authenticate user 101.

Next, automated assistant 120 prompts the user, "Great. Now look right at me . . . good, now look to your right . . . good, now to your left . . . ." While user 101 cooperates, automated assistant 120 operates camera 307 to capture a sequence of digital images $360_{1-3}$. Each of these digital images 360 captures the head of user 101 from a different angle, which is a consequence of the audio instructions being provided to user 101 to look in different directions. Using these multiple images, enrollment engine 132 is able to build a robust visual profile that automated assistant 120 can use moving forward in order to authenticate now-enrolled user 101.

Figure 4A:
Figure 4B:

FIGS. 4A and 4B depict another example scenario that illustrates what happens when a user is recognized as an enrolled user. In FIG. 4A, user 101A is unrecognized by automated assistant 120, which executes at least in part on client device 406. While client device 406 is depicted as a standalone interactive speaker, this is not meant to be limiting. Client device 406 once again includes a camera (vision sensor) 407, as well as a microphone (not depicted).

In FIG. 4A, unknown user 101A invokes automated assistant 120 with the invocation phrase, "Hey Assistant," and then provides the natural language input, "Please open the garage door." Because user 101 is not recognized, automated assistant 120, e.g., by way of enrollment engine 132, determines that unknown users are not permitted to operate the smart garage door. Accordingly, automated assistant 120 responds, "I'm sorry, I'm afraid I'm not authorized to do that for unknown users."

In FIG. 4B, by contrast, an enrolled user 101B is recognized, e.g., based on one or more of her visual and/or audible input being matched to corresponding visual and/or voice profiles in enrollment database 133. Thus, when enrolled and recognized user 101B makes the same request, automated assistant 120 complies and responds, "OK, opening the garage door."

Even with facial and voice recognition technology constantly evolving, it still is not perfect. Users may change in appearance over time. Teenage users may experience voice changes, while other users may have their voices altered by things like illness. Moreover, to keep some assistant devices from becoming too expensive, relatively inexpensive cameras, microphones, and other components may be used that are not as reliable as their more expensive counterparts. Accordingly, with techniques described herein it is possible in some implementations to partially recognize a user, or recognize them with a measure of confidence that falls below absolute certainty. Rather than simply placing the partially recognized user into either a fully trusted mode or a fully untrusted mode, in various implementations, the partially recognized user may be placed into one or more intermediate levels (or bins) of trust in which they may be provided access to some, but not necessarily all, features that would otherwise be provided to a fully recognized user.

Figure 5:
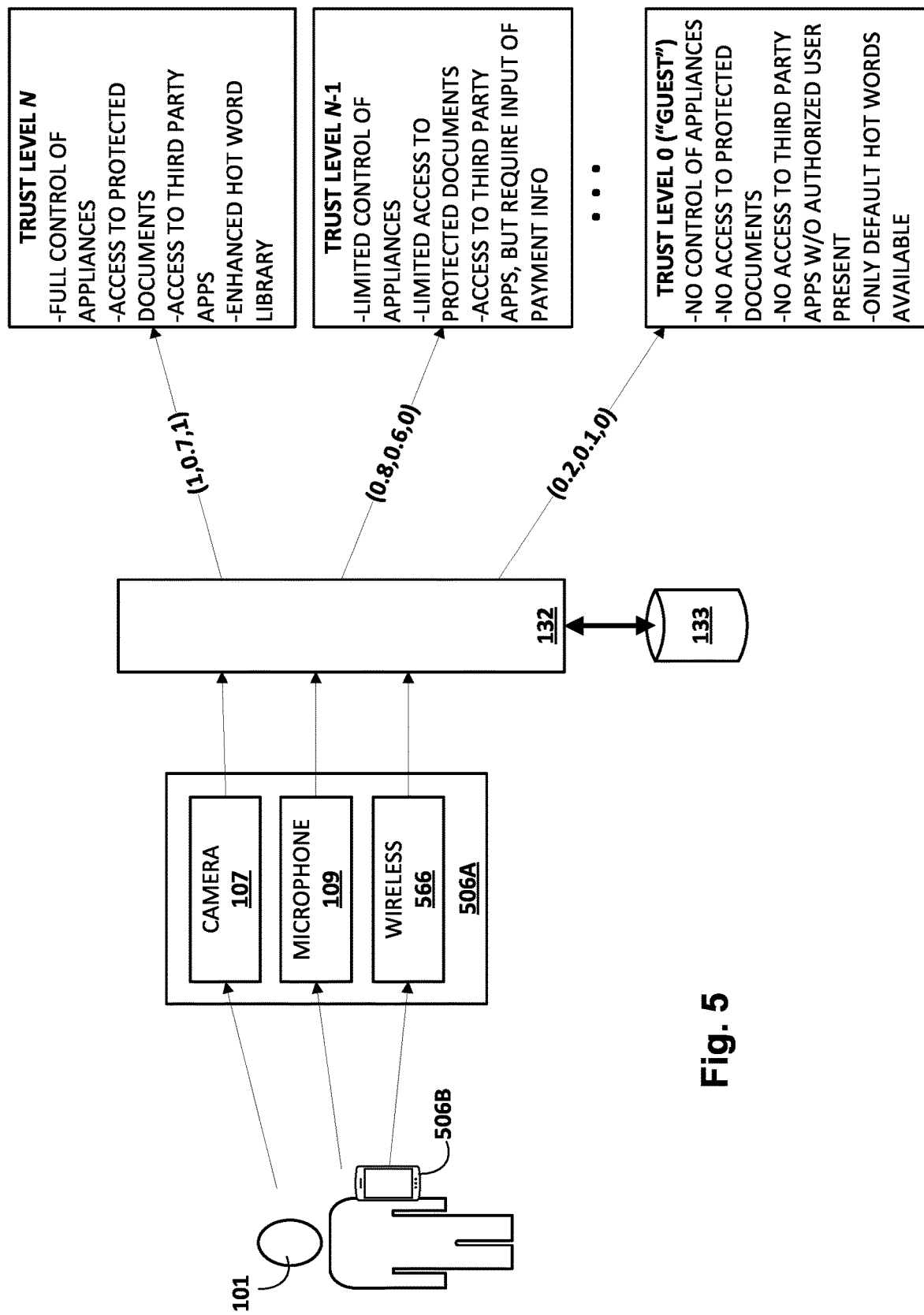
FIG. 5 schematically depicts an example of assigning users to levels of trust based on a confidence measure associated with recognition of the individual.

FIG. 5 schematically demonstrates one example of how users may be placed into multiple levels of trust based on how confidently they are recognized. In FIG. 5, a client device 506A configured with selected aspects of the present disclosure includes a camera 107, a microphone 109, and one or more wireless receivers 566. As noted previously, one or more wireless receivers 566 may implement various wireless communication technologies, including but not limited to Wi-Fi, Bluetooth, ZigBee, Z-Wave, infrared communications, radio frequency (e.g., RFID), and so forth. A user 101 may also carry his or her own client device 506B that in FIG. 5 takes the form of a smart phone, although this is not meant to be limiting. For example, users may carry other computing devices, such as smart glasses, smart watches, etc.

In FIG. 5, client device 506A may detect distinguishing features of user 101 in three domains. Camera 107 may capture one or more digital images. Microphone 109 may capture audio data. And wireless receiver 566 may capture a wireless signal emitted by client device 506B that includes, for instance, data that is useable to recognize an identity of user 101. Based on one or more of the distinguishing attributes, enrollment engine 132 may determine in which of a plurality of trust levels user 101 should be placed.

In FIG. 5 there are N (positive integer) trust levels. A highest level of trust N gives the user virtually unfettered access to features provided by automated assistant 120, such as controlling appliances (e.g., lights, thermostat, smart locks, smart garage door openers), access to protected documents (e.g., a calendar or other personal documents of a host user), and access to third party apps (e.g., 150 in FIG. 1). Full access to third party apps may allow user 101 to cause automated assistant 120 to, for example, make purchases (e.g., order pizza, order ride share, etc.) from third party apps without requiring user 101 to provide payment information each time. The highest level of trust also provides the user with access to an enhanced hot word library, which may allow the trust user to invoke automated assistant 120 (as described in reference to FIG. 2) using hot word(s) other than the default hot words.

A next highest level of trust N-1 may provide user 101 with less features of automated assistant 120 than the highest level of trust N, but still may permit user 101 to perform some actions. For example, user 101 may have limited control of appliances such that user 101 may, for example, adjust lights (which may not be deemed particularly sensitive), but is not able to adjust more sensitive appliances such as smart garages or smart locks. User 101 may also have limited access to documents controlled by the host user, such as read-only access, or only access to low-sensitivity documents. User 101 also may be able to engage automated assistant 120 to liaise with third party apps, but may be required to provide payment information before a purchase is authorized.

As indicated by the ellipses, there can be any number of trust levels. At bottom there is a lowest trust level ("Guest") that may be provided for user 101 if little or no recognition is possible based on distinguishing attributes of user 101. In the lowest trust level, user 101 may not be able to control appliances, may not be able to access any documents controlled by the host user, or be able to cause automated assistant 120 to liaise with third party apps. And, user 101 may only be able to invoke automated assistant 120 with default hot words. However, user 101 may still be able to cause automated assistant 120 to perform various non-sensitive operations, such as answering general questions, performing Internet searches, etc. In various implementations, an authorized user such as the host user may be able to adjust the trust levels however they wish so that various levels of trust unlock various features (other than the configuration shown in FIG. 5).

As an example, suppose digital image(s) captured by camera 107 and a wireless signal detected by wireless receiver 566 are analyzed by enrollment engine 132 to recognize user 101 with a very high confidence level. Suppose further that audio data captured by microphone 109 is analyzed by enrollment engine 132 to recognize user 101 with a somewhat lesser level of confidence. In FIG. 5, this scenario is represented by the top arrow from enrollment engine 132 to trust level N. Three confidence measures (1, 0.7, 1) corresponding to visual match, voice match, and wireless detection, respectively, are used to map user 101 to trust level N. In this example confidence measures fall between zero and one, but this is not meant to be limiting.

As another example, suppose digital image(s) captured by camera 107 yields a slightly lower confidence measure of 0.8, audio data captured by microphone 109 yields a middling confidence measure of 0.6, and no wireless signal is detected by wireless receiver 566. In FIG. 5, this scenario is represented by the middle arrow from enrollment engine 132 to trust level N-1. Three confidence measures (0.8, 0.6, 0.0) corresponding to visual match, voice match, and wireless detection, respectively, are used to map user 101 to trust level N-1. Because no wireless signal was detected and the other confidence measures were somewhat lower than the previous example, enrollment engine 132 places user 101 in trust level N-1, which means user 101 has less access to features of automated assistant 120 than in the previous example.

As yet another example, suppose digital image(s) captured by camera 107 yields a very low confidence measure of 0.2, audio data captured by microphone 109 also yields a very low confidence measure of 0.1, and no wireless signal is detected by wireless receiver 566. In FIG. 5, this scenario is represented by the bottom arrow from enrollment engine 132 to trust level N−1. Because no wireless signal was detected and the other confidence measures were quite low, enrollment engine 132 places user 101 in trust level 0, which means user 101 is treated as a guest and has access to the lowest number of features of automated assistant 120.

The example of FIG. 5 is not meant to be limiting, but rather to demonstrate one possible way of assigning users into bins or levels of trust, and providing appropriate access to features based on those assignments. For example, the host user may not allow all enrolled users access to the top level of trust. Rather, the host user may only allow automatically enrolled users access to, say, the second highest level of trust. The host user may need to provide explicit instructions for any enrolled user to be permitted to be assigned to the top level of trust. Or, the top level of trust may simply be preserved for the host user only.

Figure 6:
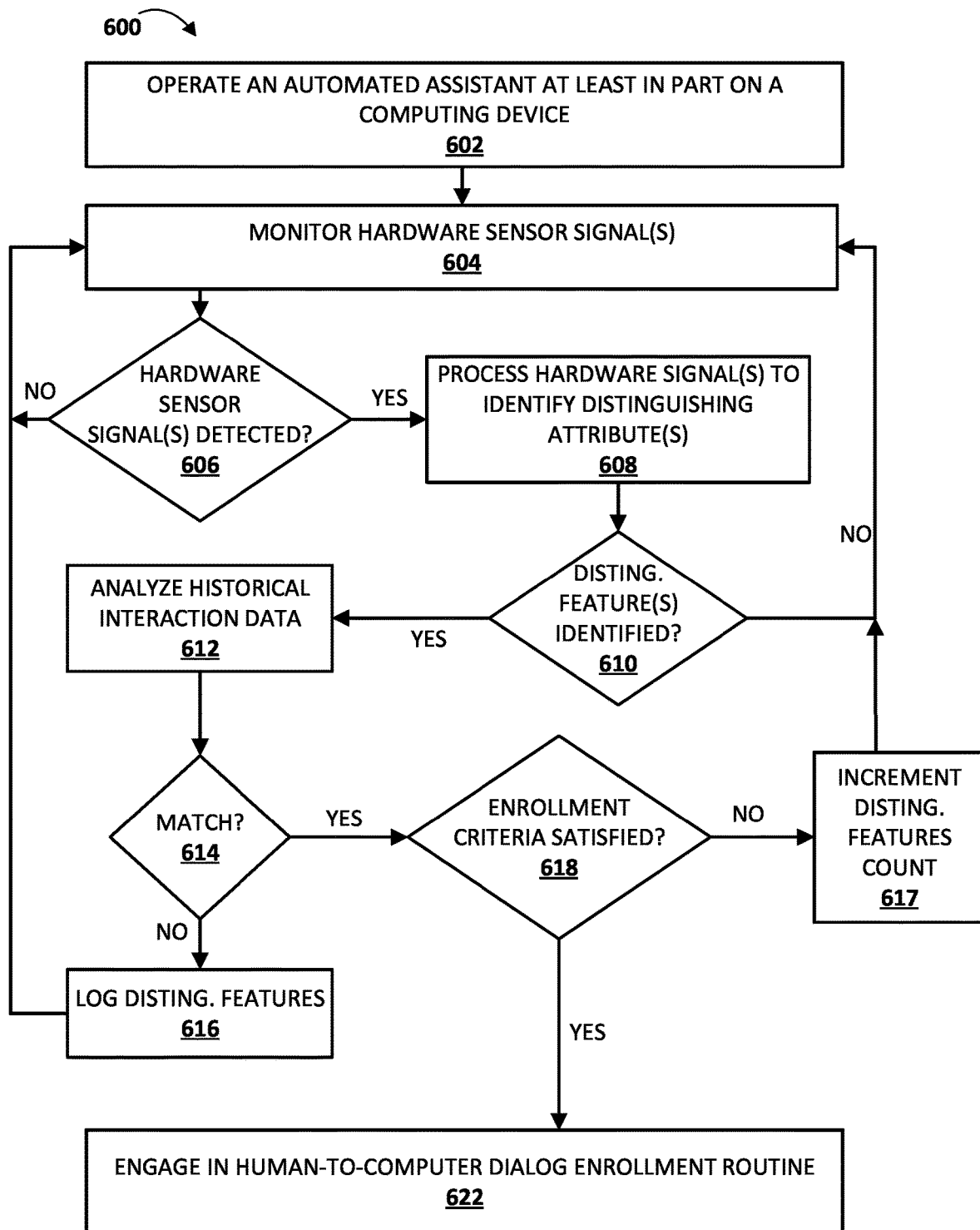
FIG. 6 depicts a flowchart illustrating an example method according to implementations disclosed herein.

FIG. 6 is a flowchart illustrating an example method 600 according to implementations disclosed herein. For convenience, the operations of the flow chart are described with reference to a system that performs the operations. This system may include various components of various computer systems, such as one or more components of automated assistant 120. Moreover, while operations of method 600 are shown in a particular order, this is not meant to be limiting. One or more operations may be reordered, omitted or added.

At block 602, the system may operate automated assistant 120 at least in part on a computing device (e.g., client device 106, 306, 406, 506). For example, and as noted above, in many cases automated assistant 120 may be implemented in part on client device 106 and in part on the cloud (e.g., cloud-based automated assistant components 119). At block 604, the system may monitor hardware sensor signals generated by sensors such as camera 107, microphone 109, proximity sensor 105, and/or wireless receiver 566, e.g., for evidence of a user who may intend to engage with automated assistant 120.

If at block 606, the system detects one or more hardware sensor signals, then at block 608, the system, e.g., by way of enrollment engine 132, may process the detected hardware signal(s) to identify distinguishing attributes of a user that triggered the hardware sensor signals. As noted previously, these distinguishing attributes may include aspects of the user's physical appearance, voice, and/or information provided by a wireless signal emitted by a mobile device carried by the user.

If distinguishing features are not identified at block 610, then method 600 returns to block 604. However, if distinguishing features are identified at block 610, then method 600 may proceed to block 612. At block 612, the system, e.g., by way of enrollment engine 132, may analyze historical interaction data, e.g., stored in enrollment database 133 or elsewhere (e.g., in local memory of client device 106, 306, 406, 506). For example, enrollment engine 132 may compare the distinguishing attributes identified at blocks 608-610 to distinguishing attributes captured from unknown users in the past.

At block 614 it may be determined whether the distinguishing attributes identified at blocks 608-610 match any stored in enrollment database 133. If the answer is no, then at block 616, the system may log the distinguishing attributes identified at blocks 608-610, e.g., in enrollment database 133, e.g., so that they can be used to the future to determine whether to enroll unknown users. However, if the answer at block 614 is yes, then at block 618, a determination may be made as to whether the automated assistant enrollment criteria are satisfied. For example, it may be determined whether the user has engaged in some threshold number of dialog sessions with automated assistant 120, or whether the user has engaged in some threshold number of dialog turns with automated assistant 120.

If the answer at block 618 is no, then method 600 may proceed to block 617. At block 617, the system may increment a count associated with the matched distinguishing features. For example, if the unknown user has been previously encountered once before, and the threshold for automated enrollment is three distinct dialog sessions, then a count associated with the distinguishing features may be incremented to two. Method 600 may then return to block 604. However, if the answer at block 618 is yes, then automated assistant 120 may engage in a human-to-computer dialog enrollment routine, similar to that depicted in FIGS. 3A and 3B and FIG. 7. Thereafter, the user may now be considered enrolled.

Figure 7:
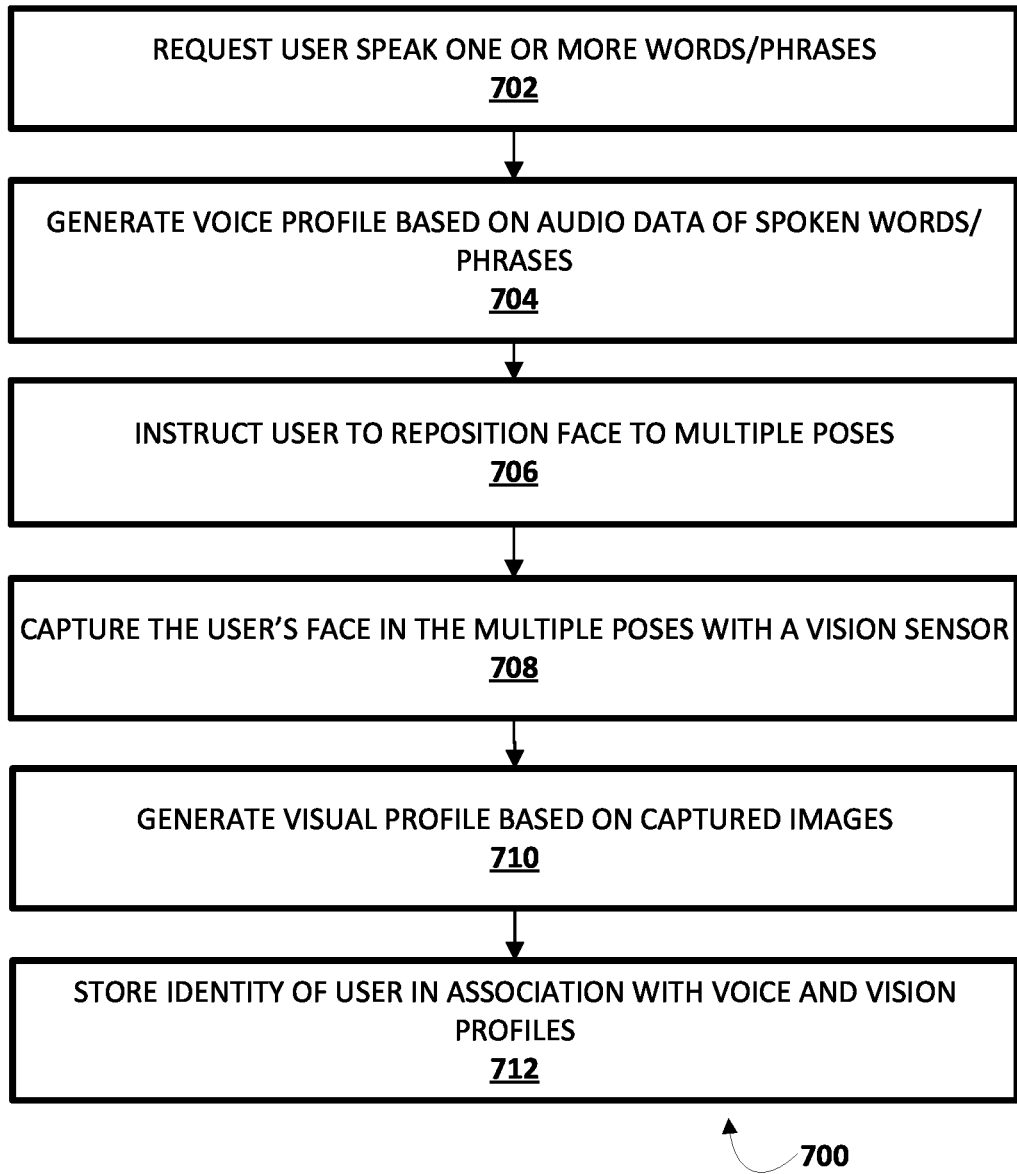
FIG. 7 depicts a flowchart illustrating an example method according to implementations disclosed herein.

FIG. 7 depicts an example method 700 for practicing an automated assistant enrollment routine, in accordance with various implementations. For convenience, the operations of the flow chart are described with reference to a system that performs the operations. This system may include various components of various computer systems. Moreover, while operations of method 700 are shown in a particular order, this is not meant to be limiting. One or more operations may be reordered, omitted or added.

At block 702, the system may request that a user speak one or more words or phrases. At block 704, the system may generate voice profile based on audio data generated from the spoken word(s) or phrases of block 702. At block 706, the system may instruct the user to reposition the user's face to multiple poses, e.g., so that multiple digital images can be captured with a vision sensor at block 708. At block 710, the system may generate a visual profile based on the captured digital images. For example, the system may train one or more convolutional neural networks based on the captured digital images. At block 712, the system may store, e.g., in enrollment database 133, an identity of the user in association with the voice and/or vision profiles.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

Figure 8:
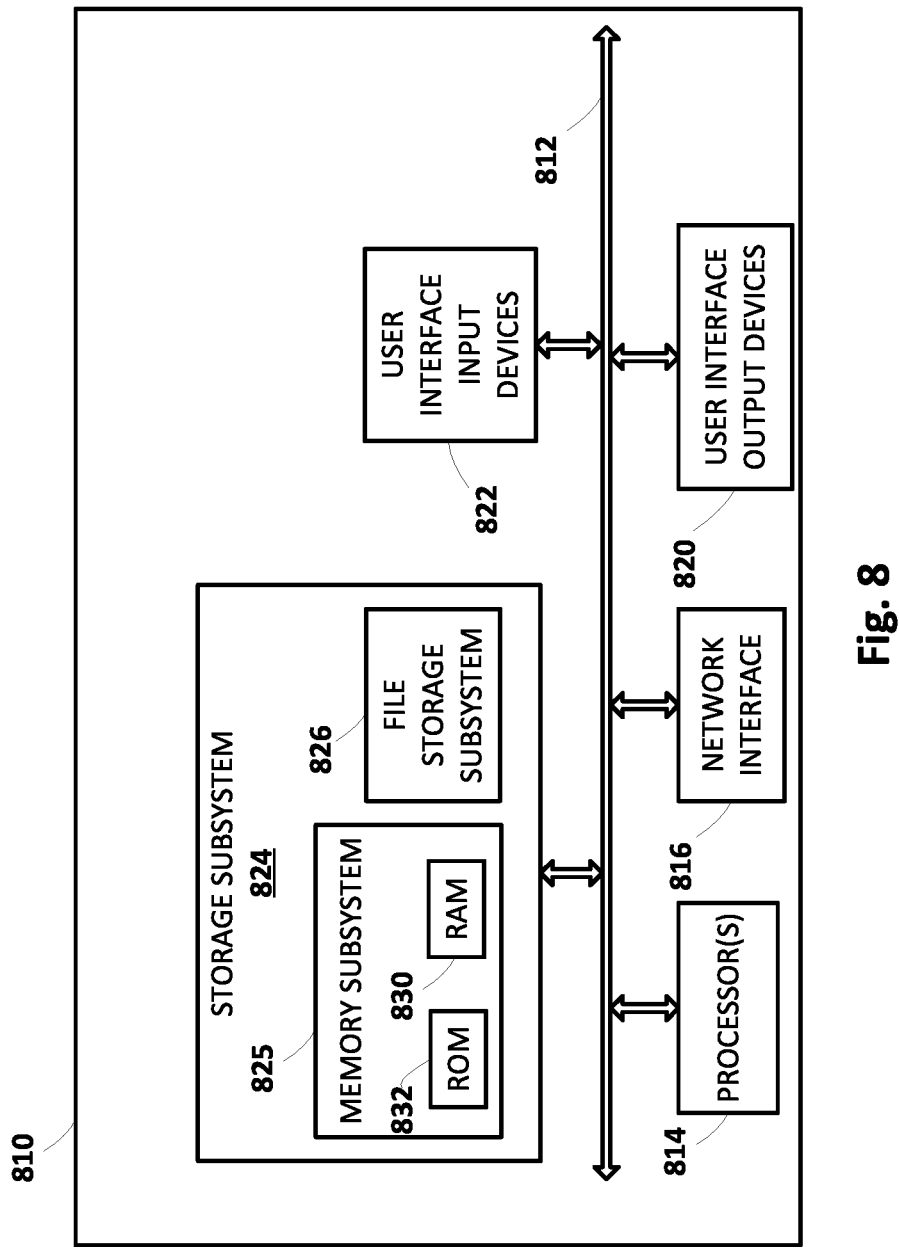
FIG. 8 illustrates an example architecture of a computing device.

FIG. 8 is a block diagram of an example computing device 810 that may optionally be utilized to perform one or more aspects of techniques described herein. In some implementations, one or more of a client computing device, user-controlled resources engine 134, and/or other component(s) may comprise one or more components of the example computing device 810.

Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the methods of FIGS. 6-7, 10-11, and 14, as well as to implement various components depicted in FIG. 1.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

Figure 9:
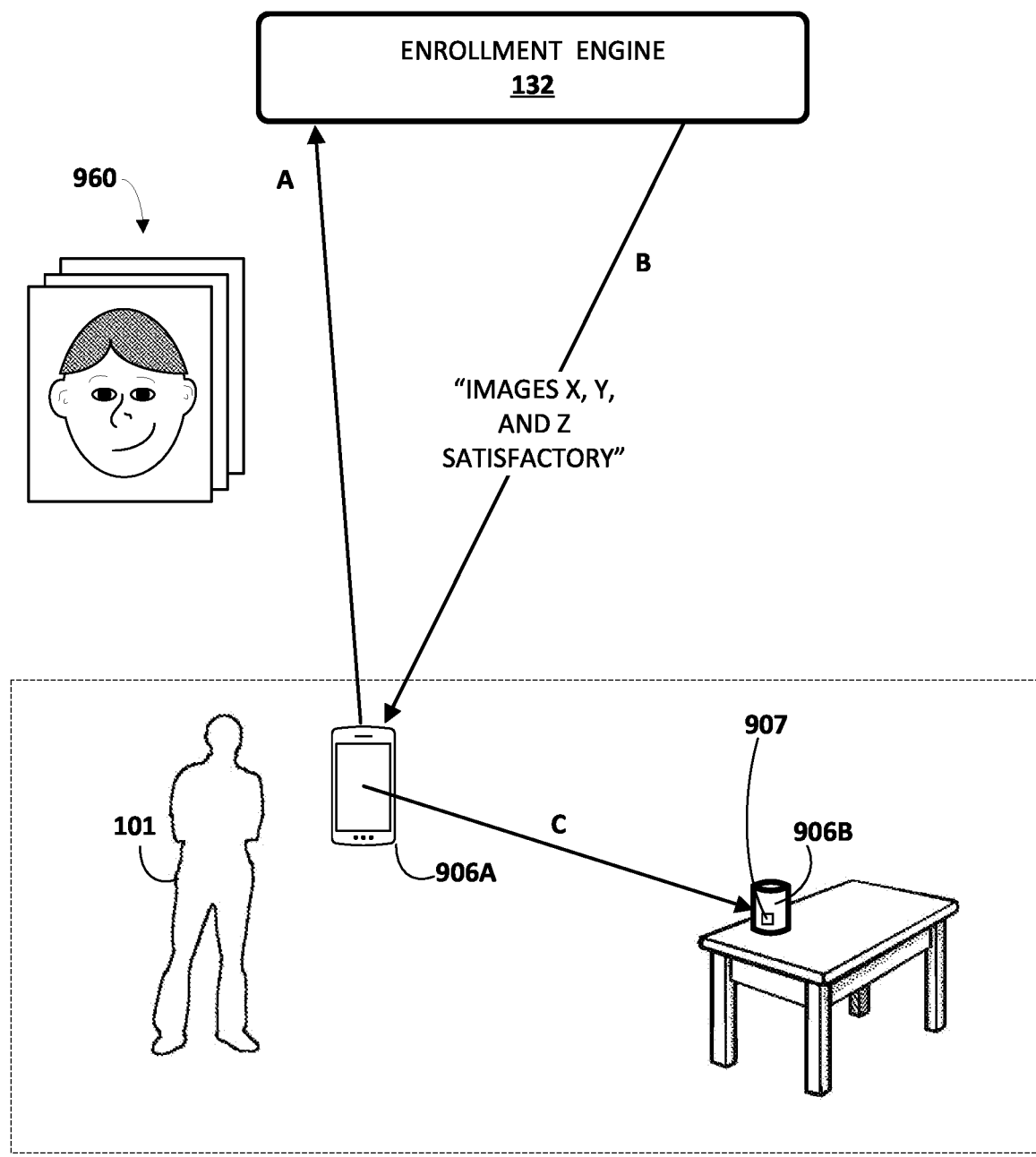
FIG. 9 demonstrates one example of visual enrollment, in accordance with various implementations.

FIG. 9 schematically depicts another aspect of the present disclosure that relates to enrolling individuals with automated assistant 120 using images captured by vision sensors. In FIG. 9, user 101 once again has engaged automated assistant 120 by way of operating a first client device 906A or a second client device 906B. First client device 906A takes the form of a hand held device—and more particularly, a smart phone—that is equipped with one or more vision sensors (not depicted) such as front-facing and/or rear-facing digital cameras commonly found on smart phones. Second client device 906B takes the form of a standalone interactive speaker that includes a vision sensor 907.

There are a variety of reasons vision sensor 907 of second client device 906B may not be suitable for capturing images that are used to enroll users with automated assistant 120. In order to keep costs down, vision sensor 907 may be relatively low-powered and/or relatively low-resolution. This may be especially true compared to the vision sensor (not depicted) of first client device 906A, which may be relatively powerful in order to allow user 101 to take high-quality/high-resolution images. Moreover, unlike first client device 906A, in some cases, second client device 906B may not include camera features such as a flash or the ability to fine-tune various camera settings (e.g., resolution, shutter speed, etc.), and therefore second client device 906B may not be as well-suited for implementing a visual human-to computer dialog enrollment routine.

Additionally or alternatively, due to its stationary nature, second client device 906B may be relatively inflexible in terms of changing a field of view of vision sensor 907 in order to better capture user 101. If user 101 is within the field of view of vision sensor 907 but there is also noise in the field of view (e.g., faces of other users, significant background activity, bad lighting, etc.), second client device 906B may not be able to take vary many remedial actions itself. User 101 could, in theory, physically reposition second client device 906 to capture a better image for enrollment purposes, but this may not be idea, e.g., because second client device 906B is tethered to a stationary power source such as AC mains.

Accordingly, in various implementations, user 101 may engage in a visual human-to-computer dialog enrollment routine in which images of user 101 are captured by a more capable and/or flexible vision sensor, such as a front-facing or rear-facing camera of first client device 906A. Because first client device 906A is hand held, user 101 can simply reposition first client device 906A in order to ensure that the field of view of its vision sensor is relatively free of noise such as other people, bad lighting, etc.

In FIG. 9, user 101 operates vision sensor(s) of first client device 906A to capture a plurality of images 960. These images may capture a face of user 101, e.g., from various angles requested by automated assistant 120 as described in FIG. 3B. At arrow A in FIG. 9, the plurality of images 960 are transmitted or uploaded, e.g., from first client device 906A to enrollment engine 132. Enrollment engine 132 may then analyze plurality of images 906 to identify at least one image as usable to create biometric data, e.g., such as a latent space embedding, that is suitable subsequently to authenticate user 101 to a computing resource.

The analysis performed by enrollment engine 132 may take various forms. In some implementations, the analysis may analyze the images to determine whether a requested view of the user's face is fully visible and is well-lit. Additionally or alternatively, enrollment engine 132 may apply the plurality of images (as a batch, one after another, etc.) as input across a trained machine learning model to generate output. The output may indicate, e.g., as binary output or as a score along a range, whether the image(s) are usable to create biometric data that is suitable subsequently to authenticate the person to a computing resource. Such a machine learning model may take various forms, including various flavors of neural networks such as a convolutional neural network.

In some implementations, enrollment engine 132 may analyze each of the plurality of images 960 to select a subset of images that adequately portray user 101 from multiple angles. For example, in some implementations, enrollment engine 132 may select one image that is a front view, another image that is a first side view, another image that is a second side view, and so forth.

Once enrollment engine 132 has determined that at least one of the images 960 is usable to create biometric data, in some implementations, enrollment engine 132 may transmit a message back to first client device 906A, as shown by arrow B in FIG. 9. This message may identify the at least one image that is usable to create the biometric data. In response to this message, in various implementations, first client device 906A may transmit, to second client device 906B as indicated at arrow C, the one or more images identified in the message.

Upon receiving the image(s) from first client device 906A, second client device 906B may generate the biometric data using the at least one image of the plurality of images. For example, second client device 906B may have stored in its memory a machine learning model that is trained to generate a latent space embedding, e.g., akin to the enrollment embedding described previously, based on the one or more images. This machine learning model may take various forms, such as various flavors of neural networks, including but not limited to a convolutional neural network.

The generated latent space embedding may then be used as biometric data to enroll user 101 with automated assistant 120 as described herein. For example, in some implementations, the enrollment may include creation of an association between an identity of user 101 and the biometric data in memory of second client device 906B. Additionally or alternatively, in some implementations, first client device 906A may generate the biometric data, e.g., the latent space embedding, and then transmit the biometric data to second client device 906B.

In either case, an advantage is realized in that the biometric data does not need to be transmitted to enrollment engine 132 or anywhere else considered part of the "cloud." Rather, the biometric data may be stored and maintained on one or both of client devices 906A-B (or any other client device forming part of the same coordinated ecosystem of client devices). Client devices 906A-B are often found at or near network endpoints, often behind security barriers such as firewalls. Consequently, in some implementations the biometric data may be accessible only to people behind the same security barriers. If a client device on which the biometric data is stored become inoperable, is destroyed, or is factory reset, then new biometric data may need to be generated based on the same images or newly-captured images.

In some implementations, images 960 uploaded to the cloud (e.g., to enrollment engine 132) may not be readily associable with an identity of user 101. For example, in some implementations, the transmission that includes images 960 may not include any information that is directly usable to identify user 101. Consequently, enrollment engine 132 is able to determine whether images 960 are suitable for creation of a biometric without compromising an identity of user 101.

Figure 10:
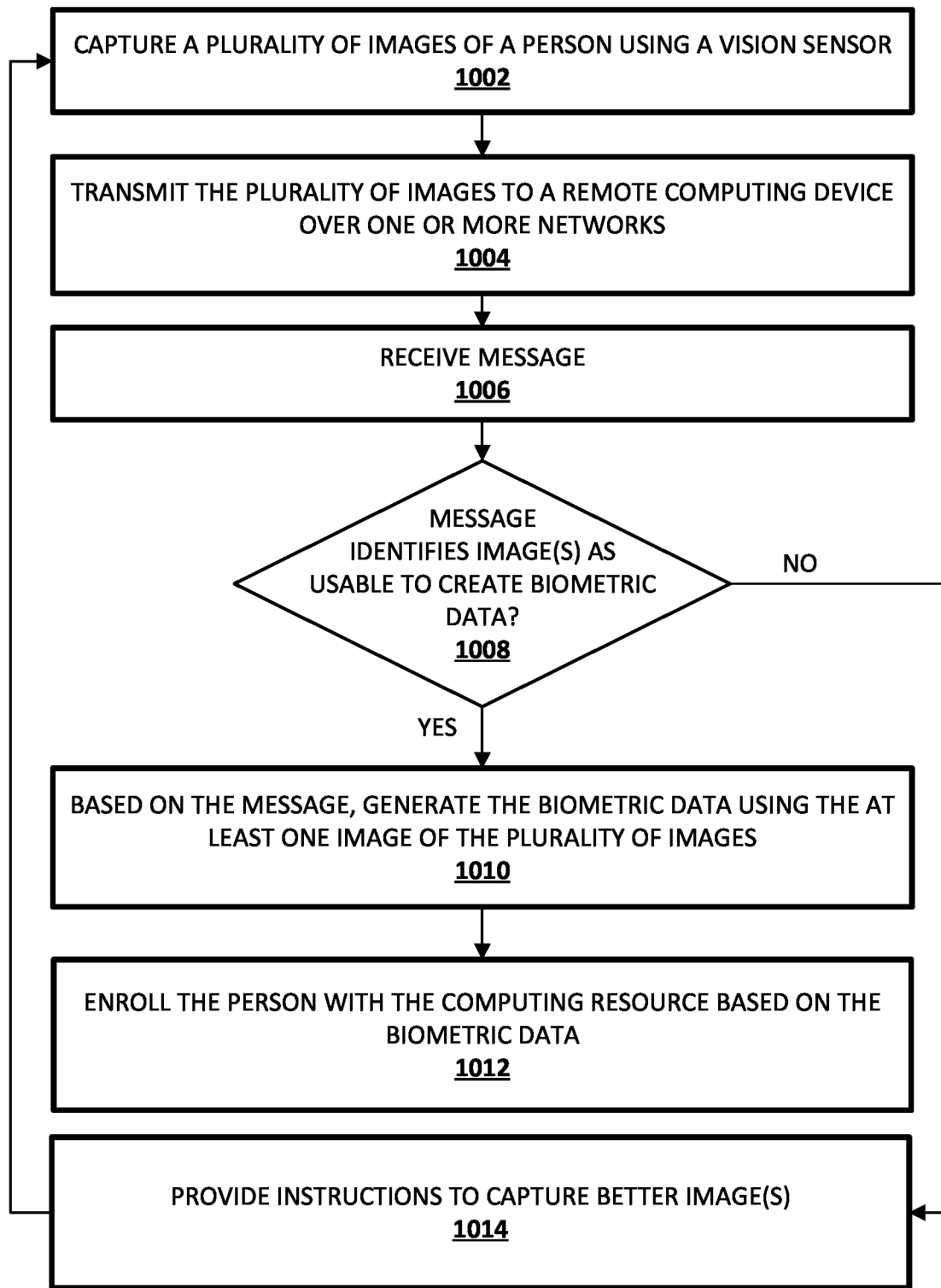
FIG. 10 depicts a flowchart illustrating an example method according to implementations disclosed herein.

FIG. 10 illustrates a flowchart of an example method 1000 for practicing selected aspects of the present disclosure, including operations that may be performed by a client device to check whether image(s) are usable to create biometric data, and to create biometric data. The steps of FIG. 10 can be performed by one or more processors, such as one or more processors of the various computing devices/systems described herein. For convenience, operations of method 1000 will be described as being performed by a system configured with selected aspects of the present disclosure. Other implementations may include additional steps than those illustrated in FIG. 10, may perform step(s) of FIG. 10 in a different order and/or in parallel, and/or may omit one or more of the steps of FIG. 10.

At block 1002, the system may capture a plurality of images of a person using a vision sensor. For example, a user may operate a digital camera-equipped hand held client device such as a smart phone to capture digital images of a person under consideration for enrollment with automated assistant 120. At block 1004, the system may transmit or "upload") the plurality of images to a remote computing device, such as a computing device operating enrollment engine 132, over one or more networks 115.

At block 1006, the system may receive, from the remote computing device over one or more of the networks, a message. The message may identify one or more images of the plurality of images as usable to create biometric data that is suitable subsequently to authenticate the person to a computing resource. If at least one image is identified in the message, then method 1000 may proceed to block 1010.

At block 1010, the system may, based on the message, generate the biometric data using the at least one image of the plurality of images. For example, the hand held smart phone, or another client device of the same coordinated ecosystem of client devices, may apply the identified image(s) as input across a trained machine learning model to generate the enrollment embedding described previously. At block 1012, the system may enroll the person with the computing resource, e.g., automated assistant 120, based on the biometric data. For example, the system may create, e.g., in memory that is local to the client device (e.g., 106, 906A, 906B), an association between an identity of the person and the biometric data in memory. In some implementations, this association may not exist outside of the client device, or outside of a coordinated ecosystem of client devices that includes the client device. For example, in some such implementations, neither the biometric data nor the association of the biometric data with the user's identity may be stored in enrollment database 133.

Back at block 1008, if the message does not identify any images as usable to create biometric data, or in some implementations if the message does not identify enough images, then method 1000 may proceed to block 1014. At block 1014, the system may provide instructions to capture better image(s). These instructions may be generated on the cloud, e.g., by enrollment engine 132, and/or may be generated on the client device. These instructions may be generated based on various factors, such as the detection, e.g., by enrollment engine 132, of noise in the image(s), such as multiple people's faces, bad lighting, excessive movement, etc. The instructions may be particularly helpful in cases where the user is operating a hand held client device such as a smart phone, e.g., because the instructions can simply prompt the user to move the phone to a different location and/or change one or more settings, either action which may reduce or eliminate noise in subsequent digital image(s).

Figure 11:
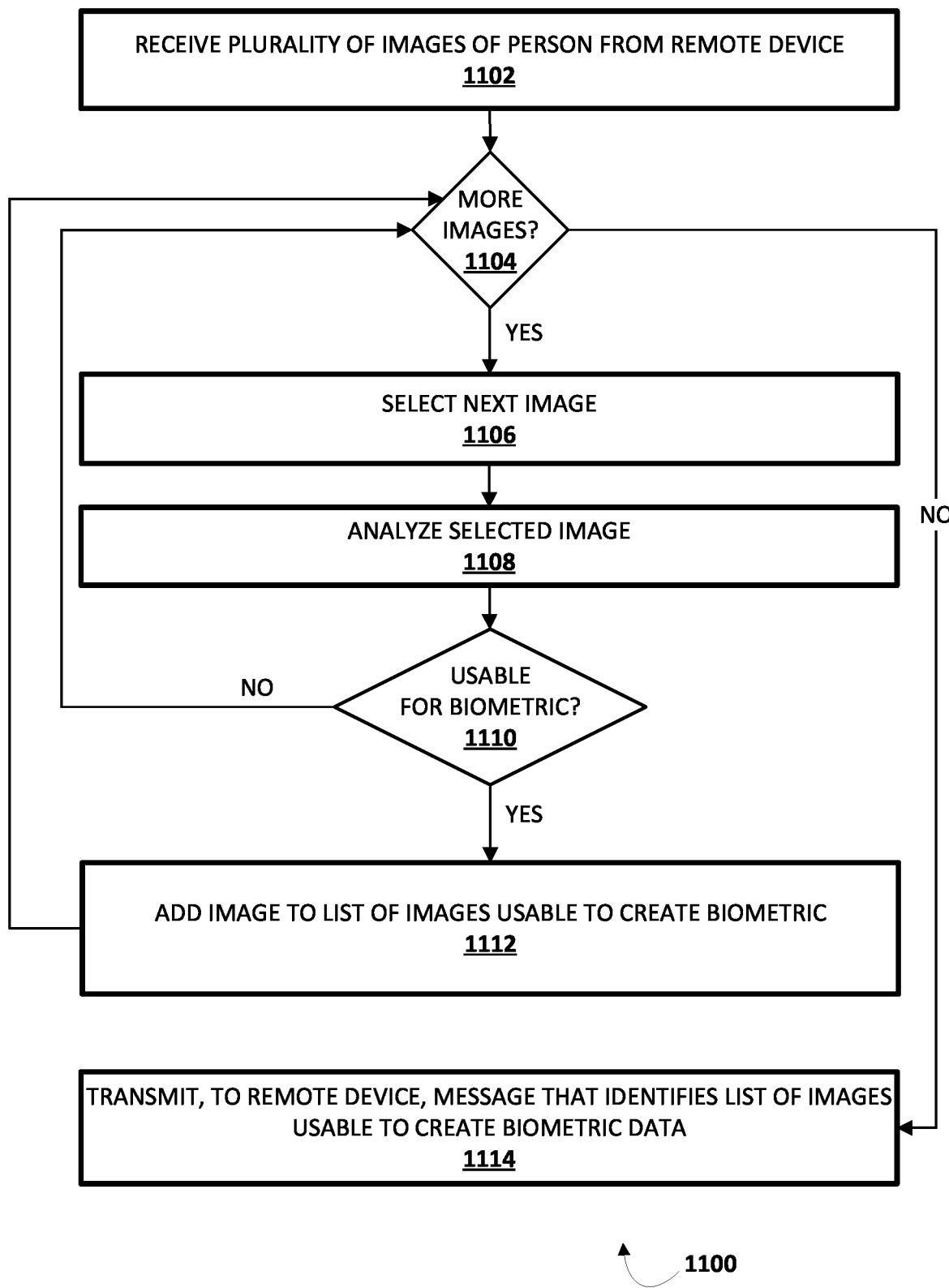
FIG. 11 depicts a flowchart illustrating an example method according to implementations disclosed herein.

FIG. 11 illustrates a flowchart of an example method 1100 for practicing selected aspects of the present disclosure, including operations that may be performed by enrollment engine 132 to check whether image(s) are usable to create biometric data. The steps of FIG. 11 can be performed by one or more processors, such as one or more processors of the various computing devices/systems described herein. For convenience, operations of method 1100 will be described as being performed by a system configured with selected aspects of the present disclosure. Other implementations may include additional steps than those illustrated in FIG. 11, may perform step(s) of FIG. 11 in a different order and/or in parallel, and/or may omit one or more of the steps of FIG. 11.

At block 1102, the system, e.g., by way of enrollment engine 132, may receive a plurality of images of a person from a remote client device, e.g., from a client device such as 106, 906A, or 906B. At block 1104, the system may determine whether there are more images to analyze. If the answer is yes, then method 1100 may proceed to block 1106, and a next image of the plurality of images may be selected. At block 1108, the system may analyze the selected image. For example, the selected image may be applied as input across one or more trained machine learning models to generate output that indicates whether or not the image is usable for biometric data creation. Based on this analysis at block 1108, at block 1110, the system may determine whether the selected image is usable to create biometric data that is suitable subsequently to authenticate a person to a computing resource. For example, the system may determine whether the selected image satisfies one or more quality criterion, such as a signal-to-noise ratio, detection of other individuals in the image, improper lighting, insufficient resolution, the individual's face is not fully captured in the field-of-view, etc.

If the answer at block 1110 is no, then method 1100 may proceed back to block 1104. However, if the answer at block 1110 is yes, then method 1100 may proceed to block 1112. At block 1112, the system may add the selected image to a list of images that are deemed usable to create biometric data. Method 1100 may then proceed back to block 1104.

Back at block 1104, if there are no more images of the plurality of images to analyze, then method 1100 may proceed to block 1114. At block 1114, the system may generate and/or transmit, back to the remote computing device, a message that identifies the list of images usable to create biometric data. This transmitting may cause one or more client devices of a coordinated ecosystem of client devices that includes the remote client device to generate the biometric data using the at least one image. In some implementations, if the list was empty or included too few images to create usable biometric data, then the system may incorporate, into the message or into a separate message, instructions for capturing better images, as described previously with regard to block 1014 of method 1000.

In the examples of FIGS. 9-11, when a plurality of images are captured and/or transmitted/uploaded, this is not meant to be limited to a single batch of images taken at a particular time. Rather, the aspects of the present disclosure described in relation to FIGS. 9-11 may be ongoing in nature. For example, an enrolled person's appearance may change over time, e.g., due to changing hairstyles, clothing, aging, etc. In various implementations, additional or subsequent digital images may be captured and used as described with respect to FIGS. 9-11 to generate "updated" biometric data. These subsequent digital images may be affirmatively requested, e.g., after some period of time since enrollment or in response to a determination that the user was only able to be authenticated with a relatively low confidence (e.g., as a result of a change in their appearance). Additionally or alternatively, these additional images may be captured passively, either automatically or as part of the user's everyday camera operation. For example, when a user takes a "selfie," the selfie may be analyzed as described herein to determine its usability to generate updated biometric data. In some such implementations, the user may be prompted for explicit permission to perform such passive analysis.

Figure 12:
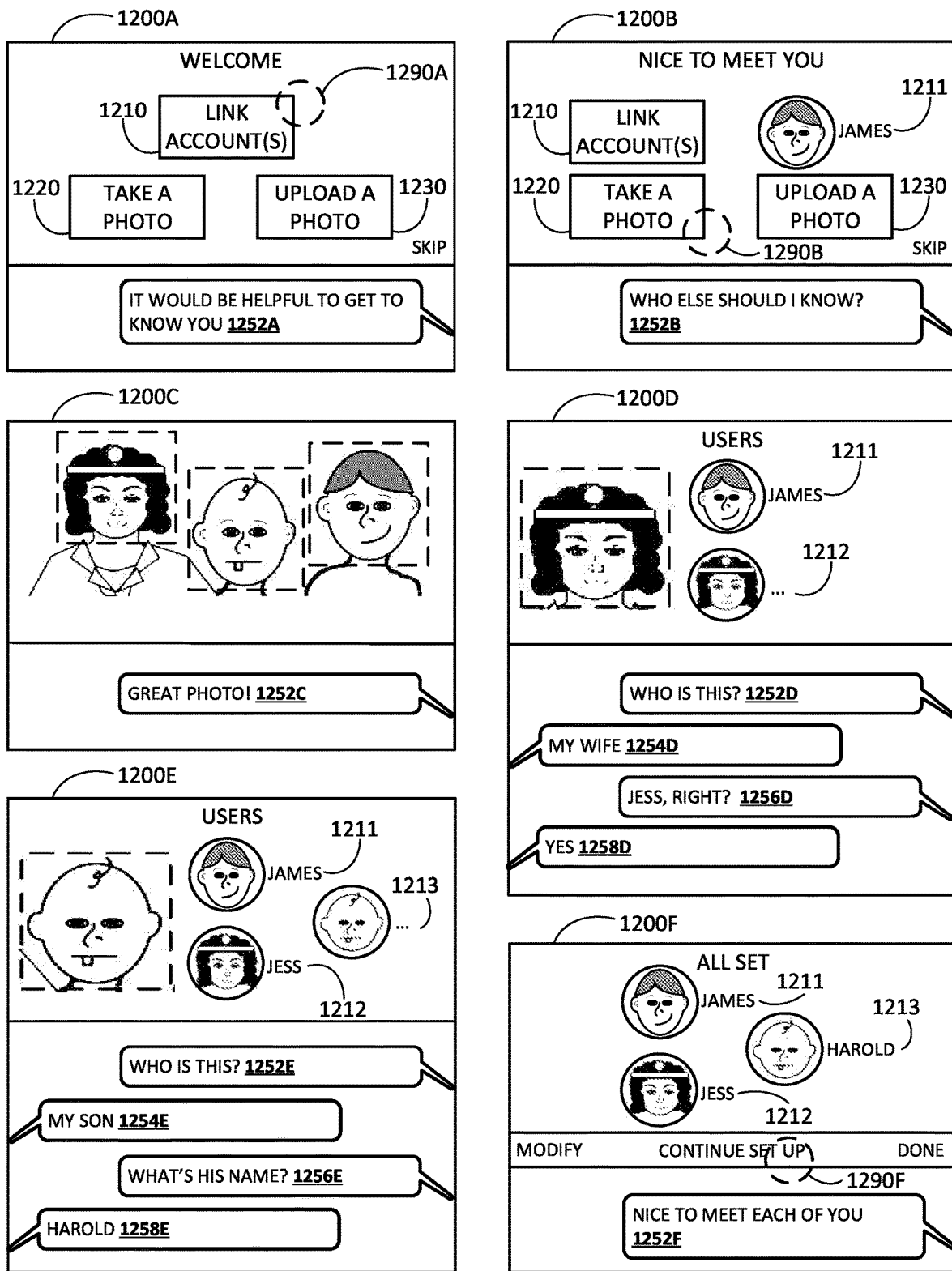
FIG. 12 depicts example graphical user interfaces for enrolling one or more users with an automated assistant, in accordance with implementations disclosed herein.

FIG. 12 depicts various graphical user interfaces 1200A-1200F for enrolling one or more users with an automated assistant executing at least in part on a computing device. The graphical user interfaces 1200A-1200F depict a human-to-computer dialog enrollment routine as part of an onboarding routine for a computing device. Although the graphical user interfaces 1200A-1200F are depicted as including particular graphical elements, and as including particular prompts provided by an automated assistant executing at least in part on a computing device (e.g., automated assistant 120 of FIG. 1), it should be understood that this is for exemplary purposes and is not meant to be limiting.

A first graphical user interface 1200A can be rendered as a "Welcome" screen during the human-to-computer dialog enrollment routine. Notably, the first graphical user interface 1200A includes a prompt 1252A from an automated assistant executing at least in part on a computing device (e.g., automated assistant 120 of FIG. 1) that indicates, "It would be helpful to get to know you." The prompt 1252A can be rendered visually via the first graphical user interface 1200A as shown on the first graphical user interface 1200A and/or audibly via one or more speakers of the computing device. Moreover, the first graphical user interface 1200A includes various graphical user interface elements 1210, 1220, 1230 that, when selected (e.g., via touch input or spoken input), enable the user to interact with the automated assistant.

In some implementations, a first graphical user interface element 1210, when selected, allows a user to link an account of the user with the automated assistant. The account of the user can include, for example, visual profiles of the user, voice profiles of the user, and/or other data related to the user. In some versions of those implementations, the account can be linked by requesting the user enter various credentials (e.g., username, email, password, and/or other credentials). In some other versions of those implementations, the account can be linked by receiving various credentials shared over one or more networks (e.g., sharing credentials from another computing device via one or more networks).

In some implementations, a second graphical user interface 1200B can be rendered on the computing device responsive to responsive to receiving user input 1290A (e.g., touch input or spoken input) at the first graphical user interface 1200A directed to the first graphical user interface element 1210 for linking an account with the automated assistant. The second graphical user interface 1200B can include an indication 1211 that the user (e.g., "James") is now associated with the automated assistant (e.g., via a linked account) executing at least in part on the computing device. Notably, the second graphical user interface 1200B also includes a prompt 1252B that indicates, "Who else should I know?" The prompt 1252B can be rendered visually at the second graphical user interface 1200B as shown on the second graphical user interface 1200B and/or audibly via one or more speakers of the computing device. Moreover, the second graphical user interface 1200B can include various graphical user interface elements 1210, 1220, 1230 that, when selected (e.g., via touch input or spoken input), enable the user to interact with the automated assistant.

In some implementations, one or more additional accounts of other users can be linked with the automated assistant as described with respect to the first graphical user interface 1200A. In some other implementations, a second graphical user interface element 1220, when selected (e.g., via touch input or spoken input), allows a user to capture one or more current images using a vision sensor of the computing device. The one or more current images should include the other users to be associated with the automated assistant. Further, in yet other implementations, a third graphical user interface element 1230, when selected (e.g., via touch input or spoken input), allows a user to upload one or more previously captured images. The one or more previously captured images should also include the other users to be associated with the automated assistant. Further, the one or more previously captured images can be uploaded from one or more databases that are accessible by the automated assistant over one or more networks (e.g., a photos application of the computing device and/or an additional computing device in communication with the computing device over one or more networks, a social media account, and/or other databases). Alternatively, if the device is a for a single user (e.g., "James"), then the user can "skip" the remainder of the human-to-computer dialog enrollment routine by directing input to the "skip" graphical element included on the first graphical user interface 1200A.

In some implementations, a third graphical user interface 1200C can be rendered on the computing device responsive to user input 1290B (e.g., via touch input or spoken input) at the second graphical user interface 1200B directed to the second graphical user interface element 1220 to capture a current image. The third graphical user interface 1200C can include the current image captured by the vision sensor of the computing device. In some versions of those implementations, the automated assistant can also include dialog 1252C from the automated assistant that includes, "Great Photo!" The dialog 1252A can be rendered visually at the third graphical user interface 1200C as shown on the first graphical user interface 1200A and/or audibly via one or more speakers of the computing device. In some versions of those implementations, the third graphical user interface 1200C can include one or more indicators of users detected in the current image. For example, the automated assistant can utilize one or more facial detection techniques, and include bounding boxes for each face detected in the current image as shown on the third graphical user interface 1200C. It should be understood that the bounding boxes are not meant to be limiting and other indicators to indicate faces detected by the automated assistant be utilized.

In implementations when the user input is directed to the second graphical user interface element 1220 to capture a current image and/or when the user selects the third graphical user interface element 1230 to upload a previously capture image, the automated assistant can sequentially provide one or more prompts soliciting identifying each of the users that have not yet established an account. Further, the one or more prompts can solicit an entity to be associated with each of these users (e.g., a name, relationship, occupation, and/or other entities representing persons). For example, a fourth graphical user interface 1200D can provide an indication of one of the detected faces captured in the current image by the vision sensor, and can prompt 1252D the user, "Who is this?" The user can provide a response 1254D, "My wife," to the prompt 1252D. In some versions of those implementations, the automated assistant can access one or more databases to determine an entity associated with "My wife". For example, the automated assistant can access a contacts database of the user, a social media profile of the user, and/or other databases. Thus, the automated assistant can provide a response 1256D of, "Jess, right?" to which the user provides a response 1258D, "Yes." Moreover, in some versions of those implementations, each user can be prompted to provide a spoken utterance for purposes of establishing a voice profile in addition to the visual profiles established based on the current image and/or previously captured image.

Continuing with the example, a fifth graphical user interface 1200E can provide an indication of another one of the detected faces captured in the current image by the vision sensor, and can prompt 1252E the user, "Who is this?" The user can provide a response 1254E, "My son," to the prompt 1252E. Because it is unlikely the user's child has identifiable information stored in one or more databases accessible by the automated assistant, the automated assistant may not be able to resolve the response 1254E, "My son." Accordingly, the automated assistant can provide another prompt 1256E, "What's his name?" to which the user provides another response 1258E, "Harold." In this manner, local accounts can be established for "Jess" and "Harold", thereby enabling "Jess" and "Harold" to utilize the automated assistant via the computing device and/or one or more additional computing devices in communication with the computing device via one or more networks. In some implementations, the local accounts can be shared among each computing device connected via one or more networks (e.g., networked smart devices of a household). In some other implementations, the local accounts can be shared among some computing device connected via one or more networks, but not others. For example, the local account for "Harold" may enable him to access common computing devices, such as various stand-alone speakers within a household, but prevent him from accessing other computing devices, such as mobile devices of "James" and/or "Jess."

Moreover, when each of the users are enrolled (e.g., via linked accounts or local accounts), a sixth graphical user interface 1200F can provide an indication of "All set" along with dialog 1252F, "Nice to meet each of you." Notably, the sixth graphical user interface 1200F includes an indication 1211, 1212, 1213 of each user enrolled with the automated assistant during the human-to-computer dialog enrollment routine. In this example, a group of users is established as a "household" (e.g., "James," "Jess," and "Harold"). Accordingly, the automated assistant can recognize each of the users in the future based on the accounts established during the human-to-computer dialog enrollment routine. Further, user input 1290F (e.g., touch input or spoken input) can be provided by the user to exit the human-to-computer dialog enrollment routine, and to continue with the onboarding routine for configuring the computing device.

In this manner, a group of users that utilize one or more common computing devices can be enrolled via the human-to-computer dialog enrollment routine. This allows user experiences to be tailored to each user in the group of users and/or the group of users as a whole. For example, if a particular user that is enrolled invokes an automated assistant and provides a user request, "What's on my calendar," then the automated assistant can respond with calendar information that is tailored to the particular user based on determining a visual profile and/or voice profile of the particular user matches that of an enrolled user. As another example, if a particular user invokes an automated assistant and provides a user request, "How much are tickets to Movie X for the family," then the automated assistant can determine "the family" includes two adults and one child and respond with an accurate amount for the tickets (e.g., "For Movie X, your total is $25–$20 for two adult tickets and $5 for a child ticket"). The groups of users can be a household as described with respect to FIG. 12 or other groups of users, such as employers, employees, teachers, and/or any other group of users that share a common computing device executing an automated assistant.

Moreover, in some implementations, each of the users in the group of users can be placed in various "levels" or "bins" of trust as described herein. For example, users having a linked accounts and/or designated local accounts may be placed in a first level of trust, and, as a result, may be permitted to control certain smart devices and/or performing other operations as described herein (e.g., with respect to FIGS. 4A and 4B). By contrast, some users having local accounts may be placed in a second or third level of trust, and, as a result, may be prevented from controlling certain smart devices and/or performing other operations. In some versions of those implementations, a user can define and/or modify these levels of trust during an onboarding routine and/or subsequent to configuring the computing device with the automated assistant.

Figure 13A:
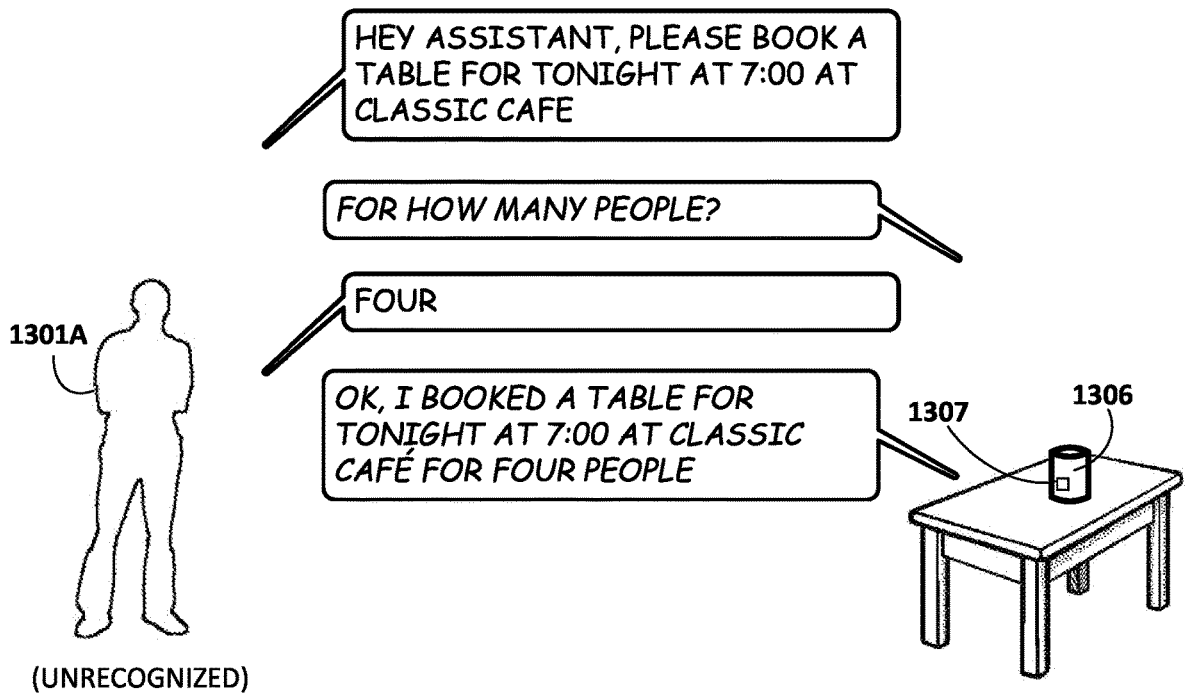
FIG. 13A and FIG. 13B depict additional example scenarios in which disclosed techniques may be employed.
Figure 13B:

FIGS. 13A and 13B depict another example scenario that illustrates what happens when a user is recognized as an enrolled user. In FIG. 13A, user 1301A is unrecognized by an automated assistant (e.g., automated assistant 120 of FIG. 1), which executes at least in part on client device 1306. While client device 1306 is depicted as a standalone interactive speaker, this is not meant to be limiting. In some implementations, client device 1306 can also include a camera (vision sensor) 1307, as well as a microphone (not depicted).

In FIG. 13A, unknown user 1301A invokes an automated assistant (e.g., automated assistant 120 of FIG. 1) with the invocation phrase, "Hey Assistant," and then provides the natural language input, "Please book a table for tonight at 7:00 at Classic Cafe." Because user 1301A is not recognized as belonging to any group of users, the automated assistant, e.g., by way of enrollment engine 132 of FIG. 1, determines that it must prompt the unknown user 1301A to obtain additional information in order to satisfy the natural language input provided by the unknown user 1301A. Accordingly, the automated assistant responds, "For how many people?," the unknown user responds, "Four," and the automated assistant responds, "OK, I booked a table for tonight at 7:00 at Classic Café for four people."

In FIG. 13B, by contrast, an enrolled user 1301B is recognized, e.g., based on one or more of her visual and/or audible input being matched to corresponding visual and/or voice profiles in enrollment database 133. Thus, when the enrolled user 1301B is recognized and makes the same request, the automated assistant determines the enrolled user 1301B belongs to a group of users that includes three users (e.g., the group of users of FIG. 12) and responds, "OK, I booked a table for tonight at 7:00 at Classic Café for four people," without having to prompt the enrolled user 1301B to obtain any additional information in order to satisfy the natural language input provided by the enrolled user 1301B. Moreover, the automated assistant can utilize an entity associated with the account of the enrolled user 1301B as a slot value in satisfying the natural language input provided by the enrolled user 1301B. For example, the automated assistant can make the reservation at Classic Café using an entity associated with the account of the enrolled user 1301B (e.g., "Jess" from FIG. 12).

Figure 14:
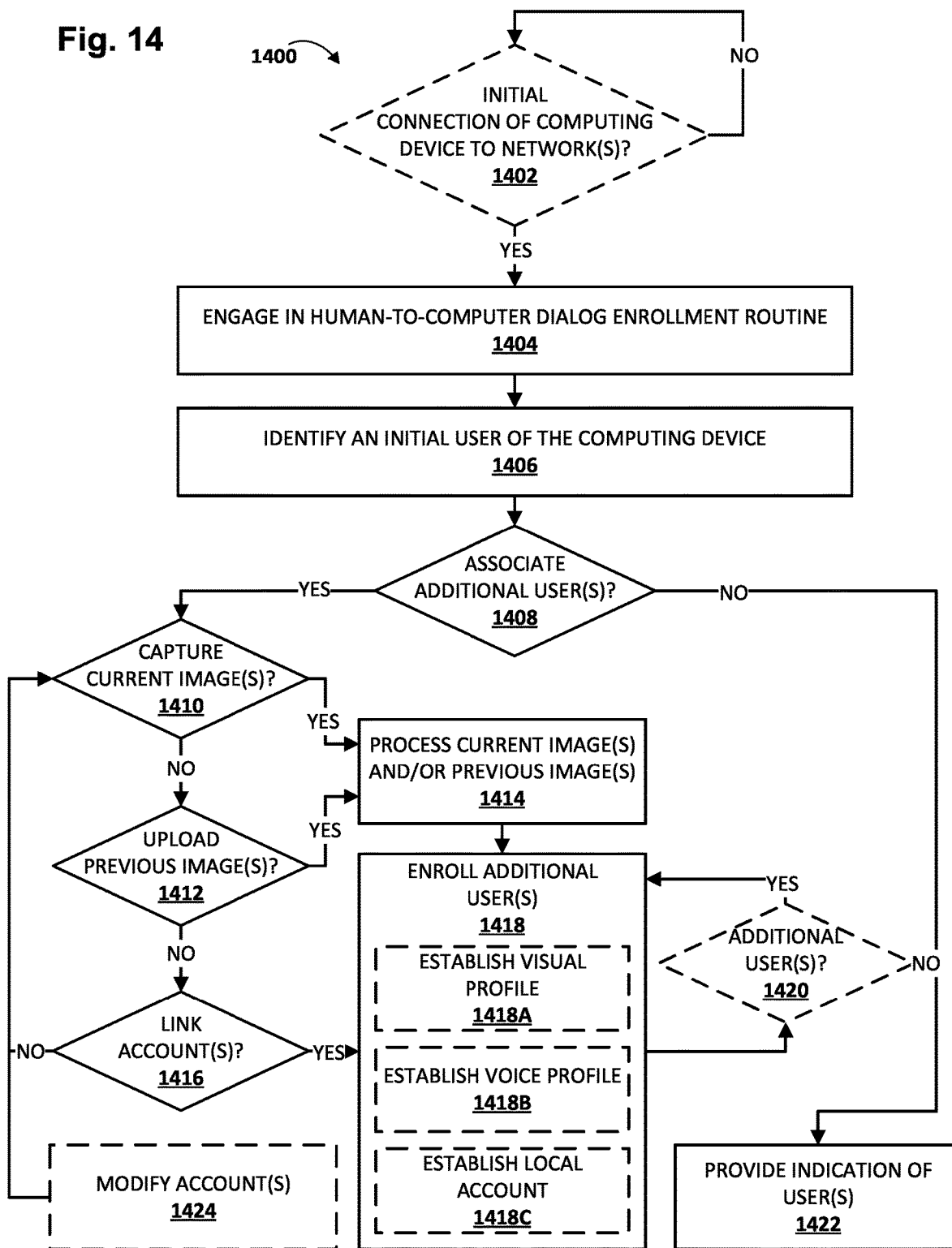
FIG. 14 depicts a flowchart illustrating an example method according to implementations disclosed herein.

FIG. 14 illustrates a flowchart of an example method 1400 for practicing selected aspects of the present disclosure, including operations that may be performed by enrollment engine 132 to engage in a human-to-computer dialog enrollment routine. The steps of FIG. 14 can be performed by one or more processors, such as one or more processors of the various computing devices/systems described herein. For convenience, operations of method 1400 will be described as being performed by a system configured with selected aspects of the present disclosure. Other implementations may include additional steps than those illustrated in FIG. 14, may perform step(s) of FIG. 14 in a different order and/or in parallel, and/or may omit one or more of the steps of FIG. 14.

At optional block 1402, the system can monitor for an initial connection of a computing device to one or more networks. An automated assistant can be executed at least in part on the computing device. For example, with reference to FIG. 1, the system can monitor for an initial connection of client devices 106 to one or more local and/or wide area networks (e.g., the Internet) indicated generally at 115. If, at an iteration of optional block 1402, the system does not detect an initial connection of a computing device to one or more networks, the system can continue monitoring for an initial connection of a computing device to one or more networks. If, at an iteration of optional block 1402, the system detects an initial connection of a computing device to one or more networks, the system can proceed to block 1404.

At block 1404, the system can engage in a human-to-computer dialog enrollment routine. In some implementations, the system can engage in a human-to-computer dialog enrollment routine responsive to detecting an initial connection of a computing device to one or more networks as described with respect to optional block 1402. In some other implementations, the system can engage in a human-to-computer dialog enrollment routine as part of an onboarding process as described with respect to FIG. 12. The human-to-computer dialog enrollment routine causes an automated assistant (e.g., automated assistant 120 of FIG. 1) executing on a computing device to output instructions for a given user to perform various actions that will facilitate recognition of the given user in the future. In some additional and/or alternative implementations, the system can engage in a human-to-computer dialog enrollment routine as part of on onboarding routine that is executed in response to the receiving an indication to configure the computing device.

At block 1406, the system can identify an initial user of the computing device. In some implementations, the system can identify an initial user based on an account associated with the initial user being linked with an automated that is executed at least in part on a computing device. In some versions of those implementations, the account of the initial user can be linked with the automated assistant during an onboarding routine for the computing device. In some further versions of those implementations, the account of the initial user can be created during the onboarding routine, while in other implementations, the account of the initial user was previously created. In some implementations, the account of the initial user can include a visual profile and/or a voice profile of the initial user. In other implementations, the initial user can establish a visual profile and/or voice profile in accordance with various techniques disclosed herein (e.g., method 700 of FIG. 7, method 1400 of FIG. 14, and/or other methods disclosed herein).

At block 1408, the system can determine whether to associate one or more additional users with the computing device. The system can determine whether to associate one or more additional users with an automated assistant (e.g., automated assistant 120 of FIG. 1) based on user input (e.g., spoken input or touch input) via a user interface of the computing device. If, at an iteration of block 1408, the system determines not to associate the one or more additional users with the computing device, the system can proceed to block 1422. At block 1422, the system can provide an indication that the user is enrolled with the automated assistant. For example, the system can provide a visual and/or audible indication that the account of the initial user has been associated with the automated assistant. Moreover, the association of the account of the initial user can be stored in an enrollment database (e.g., enrollment database 133 of FIG. 1). If, at an iteration of block 1408, the system determines to associate the one or more additional users with the computing device, the system can proceed to block 1410.

At block 1410, the system determines whether to capture one or more current images. For example, the computing device can include one or more hardware sensors that are integral to the computing device. The one or more hardware sensors can include, for example, a vision sensor, a microphone, proximity sensors, and/or other sensors. Further, the computing device can include various graphical elements that, when selected (e.g., via touch input or spoken input), enable a user to capture one or more current images of the user and/or the additional users to be associated with the automated assistant. If, at an iteration of block 1410, the system determines not to capture one or more current images, the system proceeds to block 1412.

At block 1412, the system determines whether to upload one or more previously captured images. For example, the computing device can include various graphical elements that, when selected (e.g., via touch input or spoken input), enable a user to upload one or more previously captured images of the user and/or the additional users to be associated with the automated assistant of the computing device. The system can access one or more databases that include previously captured images of the user and/or the additional users to be associated with the automated assistant of the computing device (e.g., a photos application of the computing device and/or an additional computing device in communication with the computing device over one or more networks, a social media account, and/or other databases). If, at an iteration of block 1410 and/or block 1412, the system determines to capture one or more current images and/or upload one or more previously captured images, the system proceeds to block 1414.

At block 1414, the system can process one or more of the current images and/or one or more of the previously captured images. In some implementations, the system can utilize one or more facial detection techniques to identify the user and/or the additional users to be associated with the automated assistant of the computing device. Moreover, in some versions of those implementations, the system can overlay one or more bounding boxes over the face of each of the identified users. In some additional and/or alternative implementations, the system can utilize one or more facial recognition techniques to identify the use of the initial account. In this manner, the system can distinguish the user of the initial account from the additional users to be associated with the automated assistant of the computing device. If, at an iteration of block 1412, the system determines not to upload one or more previously captured images, the system proceeds to block 1416.

At block 1416, the system can determine whether to link one or more additional accounts with the automated assistant. The one or more additional accounts for the corresponding additional users are in addition to the account of the initial user. In some implementations, the corresponding additional accounts of one or more of the additional users can be linked with the automated assistant during an onboarding routine for the computing device. In some versions of those implementations, the corresponding accounts of one or more of the additional users can be created during the onboarding routine, while in some other versions of those implementations, the corresponding accounts of one or more of the additional users were previously created. Further, in some implementations, the corresponding accounts of one or more of the additional users can include a visual profile and/or a voice profile of one or more of the additional users. In other implementations, the additional users user can establish a visual profile and/or voice profile in accordance with various techniques disclosed herein (e.g., method 700 of FIG. 7, method 1400 of FIG. 14, and/or other methods disclosed herein). If, at an iteration of block 1416, the system determines not to link one or more additional accounts with the automated assistant, then the system can return to block 1410 to associate the one or more additional users with the computing device using one or more current images and/or one or more previously captured images described with respect to block 1410 and/or block 1412. If, at an iteration of block 1416, the system determines to link one or more additional accounts with the automated assistant, then the system can proceed to block 1418.

At block 1418, the system can enroll the one or more additional users with the automated assistant (e.g., automated assistant 120 of FIG. 1). Further, in some implementations, block 1418 can include one or more optional blocks 1418A, 1418B, and/or 1418C. At optional block 1418A, the system can establish a visual profile of a given one of the one or more additional users. The visual profile can be established based on the one or more current images and/or one or more previously captured images, and can be utilized to detect/recognize a given one of the one or more additional users in the future using various facial recognition techniques. At optional block 1418B, the system can establish a voice profile of a given one of the one or more additional users. The voice profile can be established based on one or more spoken utterances, and can be utilized to detect/recognize a given one of the one or more additional users in the future using various voice recognition techniques. At optional block 1418C, the system can establish a local account for a given one of the one or more additional users. The local account can be established in lieu of a linked account. Further, in some implementations, the local account can be utilized across various computing devices connected over one or more of networks. In some versions of those implementations, the local account is not shared with one or more of the various computing devices connected over one or more of networks.

In implementations where the system determines to associate the one or more additional users with the automated assistant using one or more current images and/or one or more previously captured images described with respect to block 1410 and/or block 1412, the system can include optional block 1420. At optional block 1420, the system can determine whether one or more current images and/or one or more previously captured images include another one of the one or more additional users that have not yet been associated with the automated assistant. If, at an iteration of optional block 1420, the system determines the one or more current images and/or one or more previously captured images include another one of the one or more additional users that have not yet been identified at block 1418, the system returns to block 1418 to identify another one of the one or more additional users. If, at an iteration of optional block 1420, the system determines each user in the one or more current images and/or one or more previously captured images have been identified, then the system proceeds to block 1422.

At block 1422, the system can provide an indication that the initial account of the initial user and the one or more additional accounts of the one or more additional users are established. For example, the system can provide a visual and/or audible indication that the account of the initial user has been associated with an automated assistant (e.g., automated assistant 120 of FIG. 1) that is executed at least in part on the computing device. Moreover, the account of the initial user can be associated with an automated assistant (e.g., automated assistant 120 of FIG. 1), and the association of the account of the initial user can be stored in an enrollment database (e.g., enrollment database 133 of FIG. 1).

Even with facial and voice recognition technology constantly evolving, it still is not perfect. Further, users may change in appearance over time. Teenage users may experience voice changes, while other users may have their voices altered by things like illness. Moreover, to keep some computing devices from becoming too expensive, relatively inexpensive cameras, microphones, and other components may be used that are not as reliable as their more expensive counterparts. Accordingly, with techniques described herein it is possible in some implementations to partially recognize a user, or recognize them with a measure of confidence that falls below absolute certainty and still recognize the user associated with a given user account.

Nonetheless, in some additional and/or alternative implementations, the system can further include optional block 1424. At optional block 1424, the system can modify one or more of the user accounts associated with the automated assistant. For example, a given user can direct user input (e.g., spoken input or touch input) to a "modify" graphical user interface element of user interface 1200F of FIG. 12. Further, the system can return to block 1410 to capture a current image of at least the given user that directed the user input to the user interface to modify the corresponding user account, and continue with the method 1400 to modify the corresponding user account. In this manner, each user account associated with the computing device can be maintained over time such that visual and/or voice profiles accurately reflect the given user.

In some implementations, a method implemented using one or more processors may comprise the following operations: capturing a plurality of images of a person using a vision sensor; transmitting the plurality of images to a remote computing device over one or more networks; receiving, from the remote computing device over one or more of the networks, a message, wherein the message identifies at least one image of the plurality of images as usable to create biometric data that is suitable subsequently to authenticate the person to a computing resource; based on the message, generating the biometric data using the at least one image of the plurality of images; and enrolling the person with the computing resource based on the biometric data.

In various implementations, the biometric data comprises a latent space embedding. In various implementations, the latent space embedding is generated based on application of the at least one image of the plurality of images as input across a machine learning model.

In various implementations, the capturing and transmitting are performed at least in part using a hand held first client device. In various implementations, the generating is performed by a stationary second client device. In various implementations, the enrolling comprises creating an association between an identity of the person and the biometric data in memory of the stationary second client device. In various implementations, the computing resource comprises an automated assistant that semantically processes natural language input to determine an intent, and performs one or more responsive actions based on the intent.

In another aspect, a method implemented using one or more processors may include: receiving a plurality of images of a person from a remote client device; analyzing the plurality of images to identify at least one image of the plurality of images as usable to create biometric data that is suitable subsequently to authenticate a person to a computing resource; and transmitting, to the remote client device, a message that identifies the at least one image as usable to create biometric data. In various implementations, the transmitting causes one or more client devices of a coordinated ecosystem of client devices that includes the remote client device to generate the biometric data using the at least one image.

In various implementations, the biometric data comprises a latent space embedding. In various implementations, the analyzing comprises determining that the at least one image of the plurality of images does not capture any faces other than that of the person. In various implementations, the analyzing comprises determining that the at least one image of the plurality of images satisfies one or more quality criterion. In various implementations, the analyzing comprises applying the at least one image of the plurality of images as input across a machine learning model to generate output, wherein the output indicatives that the at least one image is usable to create the biometric data. In various implementations, the computing resource comprises an automated assistant that semantically processes natural language input to determine an intent, and performs one or more responsive actions based on the intent.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
    initiating an enrollment routine to enroll a user with an automated assistant; during the enrollment routine:
        requesting that a user of a computing device speak one or more words or phrases;
        capturing, for each of the one or more words or phrases, corresponding audio data that captures the user speaking, wherein the corresponding audio data is generated via one or more microphones of the computing device;
        generating, based on the corresponding audio data, a voice profile for the user, wherein the voice profile for the user includes audio features extracted from the corresponding audio data that distinguish the user from other users;
        instructing that the user position the user's face to multiple poses, wherein each of the multiple poses corresponds to a different pose;
        capturing, for each of the multiple poses, corresponding vision data of the user's face, wherein the corresponding vision data is generated via one or more vision components of the computing device, and wherein the corresponding vision data, for each of the multiple poses, captures the user's face in the different poses;
        generating, based on the corresponding vision data, a visual profile for the user, wherein the visual profile for the user includes visual features extracted from the corresponding vision data that distinguish the user from the other users; and
        storing, in association with the user, both the voice profile for the user and the visual profile for the user, wherein storing, in association with the user, both the voice profile for the user and the visual profile for the user comprises:
            prior to storing, in association with the user, both the voice profile for the user and the visual profile for the user:
                determining whether the user has a user account that is currently accessible by the computing device; and
                in response to determining that the user has a user account that is currently accessible by the computing device:
                    storing, in association with the user via the user account, both the voice profile for the user and the visual profile for the user; and
            subsequent to storing both the voice profile for the user and the visual profile for the user in association with the user:
                causing the voice profile for the user and/or the visual profile for the user to be utilized in authenticating the user to a computing resource at the computing device.

2. The method of claim 1, further comprising:
    in response to determining that the user does not have a user account that is currently accessible by the computing device:
        determining whether the user has a user account that is linkable to the computing device; and
        in response to determining that the user has a user account that is linkable to the computing device:
            linking the user account to the computing device; and
            storing both the voice profile for the user and the visual profile for the user in association with the user via the user account.

3. The method of claim 2, further comprising:
    in response to determining the user does not have a user account that is linkable to the computing device:
        creating a local user account that is local to the computing device; and
        storing both the voice profile for the user and the visual profile for the user in association with the user via the local user account.

4. The method of claim 3, wherein the computing device is shared among a household of users, and wherein the local user account is created for a child of the household of users.

5. The method of claim 3, wherein the local user account is shared with an ecosystem of computing devices, including the computing device and at least one additional computing device, of the household of users and over a local area network connection.

6. The method of claim 1, further comprising:
    during the enrollment routine or a subsequent enrollment routine:
        requesting that an additional user of the computing device speak the one or more words or phrases;
        capturing, for each of the one or more words or phrases, additional corresponding audio data that captures the additional user speaking, wherein the additional corresponding audio data is generated via the one or more microphones of the computing device;
        generating, based on the additional corresponding audio data, an additional voice profile for the additional user, wherein the additional voice profile for the additional user includes additional audio features extracted from the additional corresponding audio data that distinguish the additional user from the user and the other users;

instructing that the additional user position the additional user's face to the multiple poses;
capturing, for each of the multiple poses, additional corresponding vision data of the additional user's face, wherein the additional corresponding vision data is generated via the one or more vision components of the computing device, and wherein the additional corresponding vision data, for each of the multiple poses, captures the additional user's face in the different poses;
generating, based on the additional corresponding vision data, an additional visual profile for the additional user, wherein the additional visual profile for the additional user includes additional visual features extracted from the additional corresponding vision data that distinguish the additional user the additional user and from the other users; and
storing, in association with the additional user, both the additional voice profile for the additional user and the additional visual profile for the additional user; and
subsequent to storing both the additional voice profile for the additional user and the additional visual profile for the additional user in association with the additional user:
causing the additional voice profile for the additional user and/or the additional visual profile for the additional user to be utilized in authenticating the additional user to the computing resource and/or an additional computing resource at the computing device.

7. The method of claim 6, wherein the user is associated with a first trust level, wherein the additional user is associated with a trust permission level, and wherein the first trust level differs from the second trust level.

8. A computing device comprising:
one or more processors; and
memory storing instructions that, when executed by the one or more processors, cause the one or more processors to:
initiate an enrollment routine to enroll a user with an automated assistant; during the enrollment routine:
request that a user of a computing device speak one or more words or phrases;
capture, for each of the one or more words or phrases, corresponding audio data that captures the user speaking, wherein the corresponding audio data is generated via one or more microphones of the computing device;
generate, based on the corresponding audio data, a voice profile for the user, wherein the visual profile for the user includes audio features extracted from the corresponding audio data that distinguish the user from other users;
instruct that the user position the user's face to multiple poses, wherein each of the multiple poses corresponds to a different pose;
capture, for each of the multiple poses, corresponding vision data of the user's face, wherein the corresponding vision data is generated via one or more vision components of the computing device, and wherein the corresponding vision data, for each of the multiple poses, captures the user's face in the different poses;
generate, based on the corresponding vision data, a visual profile for the user, wherein the voice profile for the user includes visual features extracted from the corresponding vision data that distinguish the user from other users; and
store, in association with the user, both the voice profile for the user and the visual profile for the user, wherein the instructions to store, in association with the user, both the voice profile for the user and the visual profile for the user comprise instructions to:
prior to storing, in association with the user, both the voice profile for the user and the visual profile for the user:
determine whether the user has a user account that is currently accessible by the computing device; and
in response to determining that the user has a user account that is currently accessible by the computing device:
store, in association with the user via the user account, both the voice profile for the user and the visual profile for the user; and
subsequent to storing both the voice profile for the user and the visual profile for the user in association with the user:
cause the voice profile for the user and/or the visual profile for the user to be utilized in authenticating the user to a computing resource at the computing device.

9. The computing device of claim 8, wherein the instructions further cause the one or more processors to:
in response to determining that the user does not have a user account that is currently accessible by the computing device:
determine whether the user has a user account that is linkable to the computing device; and
in response to determining that the user has a user account that is linkable to the computing device:
link the user account to the computing device; and
store both the voice profile for the user and the visual profile for the user in association with the user via the user account.

10. The computing device of claim 9, wherein the instructions further cause the one or more processors to:
in response to determining the user does not have a user account that is linkable to the computing device:
create a local user account that is local to the computing device; and
store both the voice profile for the user and the visual profile for the user in association with the user via the local user account.

11. The computing device of claim 10, wherein the computing device is shared among a household of users, and wherein the local user account is created for a child of the household of users.

12. The computing device of claim 10, wherein the local user account is shared with an ecosystem of computing devices, including the computing device and at least one additional computing device, of the household of users and over a local area network connection.

13. The computing device of claim 8, wherein the instructions further cause the one or more processors to:
during the enrollment routine or a subsequent enrollment routine:
request that an additional user of the computing device speak the one or more words or phrases;
capture, for each of the one or more words or phrases, additional corresponding audio data that captures the additional user speaking, wherein the additional corresponding audio data is generated via the one or more microphones of the computing device;

generate, based on the additional corresponding audio data, an additional voice profile for the additional user, wherein the additional voice profile for the additional user includes additional audio features extracted from the additional corresponding audio data that distinguish the additional user from the user and the other users;

instruct that the additional user position the additional user's face to the multiple poses;

capture, for each of the multiple poses, additional corresponding vision data of the additional user's face, wherein the additional corresponding vision data is generated via the one or more vision components of the computing device, and wherein the additional corresponding vision data, for each of the multiple poses, captures the additional user's face in the different poses;

generate, based on the additional corresponding vision data, an additional visual profile for the additional user, wherein the additional visual profile for the additional user includes additional visual features extracted from the additional corresponding vision data that distinguish the additional user the additional user and from the other users; and store, in association with the additional user, both the additional voice profile for the additional user and the additional visual profile for the additional user; and subsequent to storing both the additional voice profile for the additional user and the additional visual profile for the additional user in association with the additional user:

cause the additional voice profile for the additional user and/or the additional visual profile for the additional user to be utilized in authenticating the additional user to the computing resource and/or an additional computing resource at the computing device.

14. The computing device of claim 13, wherein the user is associated with a first trust level, wherein the additional user is associated with a trust permission level, and wherein the first trust level differs from the second trust level.

15. A non-transitory computer-readable storage medium storing instructions that, when executed by one or more processors, cause the one or more processors to perform operations, the operations comprising:

initiating an enrollment routine to enroll a user with an automated assistant;

during the enrollment routine:

requesting that a user of a computing device speak one or more words or phrases;

capturing, for each of the one or more words or phrases, corresponding audio data that captures the user speaking, wherein the corresponding audio data is generated via one or more microphones of the computing device;

generating, based on the corresponding audio data, a voice profile for the user, wherein the voice profile for the user includes audio features extracted from the corresponding audio data that distinguish the user from other users;

instructing that the user position the user's face to multiple poses, wherein each of the multiple poses corresponds to a different pose;

capturing, for each of the multiple poses, corresponding vision data of the user's face, wherein the corresponding vision data is generated via one or more vision components of the computing device, and wherein the corresponding vision data, for each of the multiple poses, captures the user's face in the different poses;

generating, based on the corresponding vision data, a visual profile for the user, wherein the visual profile for the user includes visual features extracted from the corresponding vision data that distinguish the user from other users; and storing, in association with the user, both the voice profile for the user and the visual profile for the user, wherein storing, in association with the user, both the voice profile for the user and the visual profile for the user comprises:

prior to storing, in association with the user, both the voice profile for the user and the visual profile for the user:

determining whether the user has a user account that is currently accessible by the computing device; and in response to determining that the user has a user account that is currently accessible by the computing device:

storing, in association with the user via the user account, both the voice profile for the user and the visual profile for the user; and subsequent to storing both the voice profile for the user and the visual profile for the user in association with the user:

causing the voice profile for the user and/or the visual profile for the user to be utilized in authenticating the user to a computing resource at the computing device.

\* \* \* \* \*